US008523129B2

(12) United States Patent
Stifal et al.

(10) Patent No.: US 8,523,129 B2
(45) Date of Patent: *Sep. 3, 2013

(54) ADJUSTABALE DISPLAY MOUNT

(71) Applicant: Peerless Industries, Inc., Aurora, IL (US)

(72) Inventors: Matthew William Stifal, Portage, IN (US); James D. Walters, Saint Charles, IL (US)

(73) Assignee: Peerless Industries, Inc., Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,504

(22) Filed: Nov. 19, 2012

(65) Prior Publication Data

US 2013/0075551 A1 Mar. 28, 2013

Related U.S. Application Data

(63) Continuation of application No. 12/704,777, filed on Feb. 12, 2010, now Pat. No. 8,333,355.

(51) Int. Cl.
*E04G 3/00* (2006.01)
(52) U.S. Cl.
USPC ............... 248/284.1; 248/276.1; 248/299.1; 248/917; 248/922; 248/923
(58) Field of Classification Search
USPC ............... 248/284.1, 299.1, 289.1, 919, 917, 248/923, 309.1, 176.1
See application file for complete search history.

(56) References Cited

U.S. PATENT DOCUMENTS

| 2,697,572 | A | 12/1954 | Pfankuch |
| 2,791,388 | A | 5/1957 | Hirt |
| 4,611,779 | A | 9/1986 | Leonard, Jr. |
| 5,138,134 | A | 8/1992 | Ellison |
| 5,947,438 | A | 9/1999 | Lemire |
| 6,003,825 | A | 12/1999 | Abernathy, Jr. |
| 6,032,915 | A | 3/2000 | Brindisi |
| 6,095,479 | A | 8/2000 | Brindisi |
| 6,241,210 | B1 | 6/2001 | Brindisi |
| 6,283,434 | B1 | 9/2001 | Holder |
| 6,550,739 | B1 | 4/2003 | Brindisi |

(Continued)

FOREIGN PATENT DOCUMENTS

| CN | 201293191 | 8/2009 |
| WO | WO 03/036950 A1 | 5/2003 |
| WO | WO 2009/033133 A1 | 3/2009 |
| WO | WO 2009/089178 A1 | 7/2009 |

OTHER PUBLICATIONS

International Search and Written Opinion for PCT/US2010/050410, issued Dec. 23, 2010.

*Primary Examiner* — Amy J Sterling
(74) *Attorney, Agent, or Firm* — Foley & Lardner LLP

(57) ABSTRACT

A mounting system for mounting a display device to a surface, the mounting system adjustable in multiple degrees of freedom to selectively position and orientate the attached device relative to the mounting surface and/or other collocated display devices. According to various embodiments, a surface bracket is configured to attach to a mounting surface and an arm assembly operatively couples the surface bracket with a mount carriage. A mount bracket is movably coupled to the mount carriage and is selectively movable in a plane substantially parallel to the surface. A plurality of device bracket assemblies are coupled to the mount bracket. Each of the device bracket assemblies is selectively movable to translate, pivot and tilt the attached device.

20 Claims, 17 Drawing Sheets

(56) References Cited

U.S. PATENT DOCUMENTS

| | | |
|---|---|---|
| 6,554,242 B2 | 4/2003 | Kim |
| 6,578,812 B2 | 6/2003 | Lemire |
| D488,708 S | 4/2004 | Lam et al. |
| D489,599 S | 5/2004 | Lam |
| D493,800 S | 8/2004 | Pfister et al. |
| D494,596 S | 8/2004 | Pfister |
| D505,858 S | 6/2005 | O'Keene |
| 6,905,101 B1 | 6/2005 | Dittmer |
| 7,028,961 B1 | 4/2006 | Dittmer et al. |
| D528,901 S | 9/2006 | David |
| D530,595 S | 10/2006 | Lam et al. |
| 7,152,836 B2 | 12/2006 | Pfister et al. |
| 7,178,775 B2 | 2/2007 | Pfister et al. |
| D538,632 S | 3/2007 | Ly Hau et al. |
| D539,125 S | 3/2007 | Ly Hau et al. |
| D539,128 S | 3/2007 | Ly Hau et al. |
| D539,637 S | 4/2007 | Ly Hau et al. |
| 7,300,029 B2 | 11/2007 | Petrick et al. |
| D560,671 S | 1/2008 | Muday et al. |
| 7,316,379 B1 | 1/2008 | Graham |
| D570,852 S | 6/2008 | Muday et al. |
| 7,380,760 B2 | 6/2008 | Dittmer |
| 7,387,286 B2 | 6/2008 | Dittmer et al. |
| 7,395,996 B2 | 7/2008 | Dittmer |
| 7,438,269 B2 | 10/2008 | Pfister et al. |
| 7,510,156 B1 | 3/2009 | Yaeger |
| 7,523,907 B2 | 4/2009 | Chen |
| D625,300 S | 10/2010 | Stifal et al. |
| 8,094,438 B2 | 1/2012 | Dittmer et al. |
| 2002/0033436 A1 | 3/2002 | Peng et al. |
| 2002/0179791 A1 | 12/2002 | Kwon |
| 2002/0179801 A1 | 12/2002 | Kim |
| 2003/0141425 A1 | 7/2003 | Obdeijn |
| 2005/0087661 A1 | 4/2005 | Rabenius |
| 2005/0097586 A1 | 5/2005 | Hara et al. |
| 2005/0110911 A1 | 5/2005 | Childrey et al. |
| 2005/0133678 A1 | 6/2005 | Dittmer |
| 2005/0167549 A1 | 8/2005 | Ligertwood |
| 2005/0236542 A1 | 10/2005 | O'Neill |
| 2006/0006295 A1 | 1/2006 | Gainer |
| 2006/0231711 A1 | 10/2006 | Shin |
| 2006/0244870 A1 | 11/2006 | Yamato et al. |
| 2007/0023593 A1 | 2/2007 | Fedewa |
| 2007/0083880 A1 | 4/2007 | Bae |
| 2007/0158515 A1 | 7/2007 | Dittmer et al. |
| 2008/0078907 A1 | 4/2008 | Huang |
| 2008/0315049 A1 | 12/2008 | Bailo et al. |
| 2009/0050763 A1 | 2/2009 | Dittmer |
| 2009/0065667 A1 | 3/2009 | Bakkom et al. |
| 2009/0194655 A1 | 8/2009 | Huang |
| 2009/0256040 A1 | 10/2009 | Lee et al. |

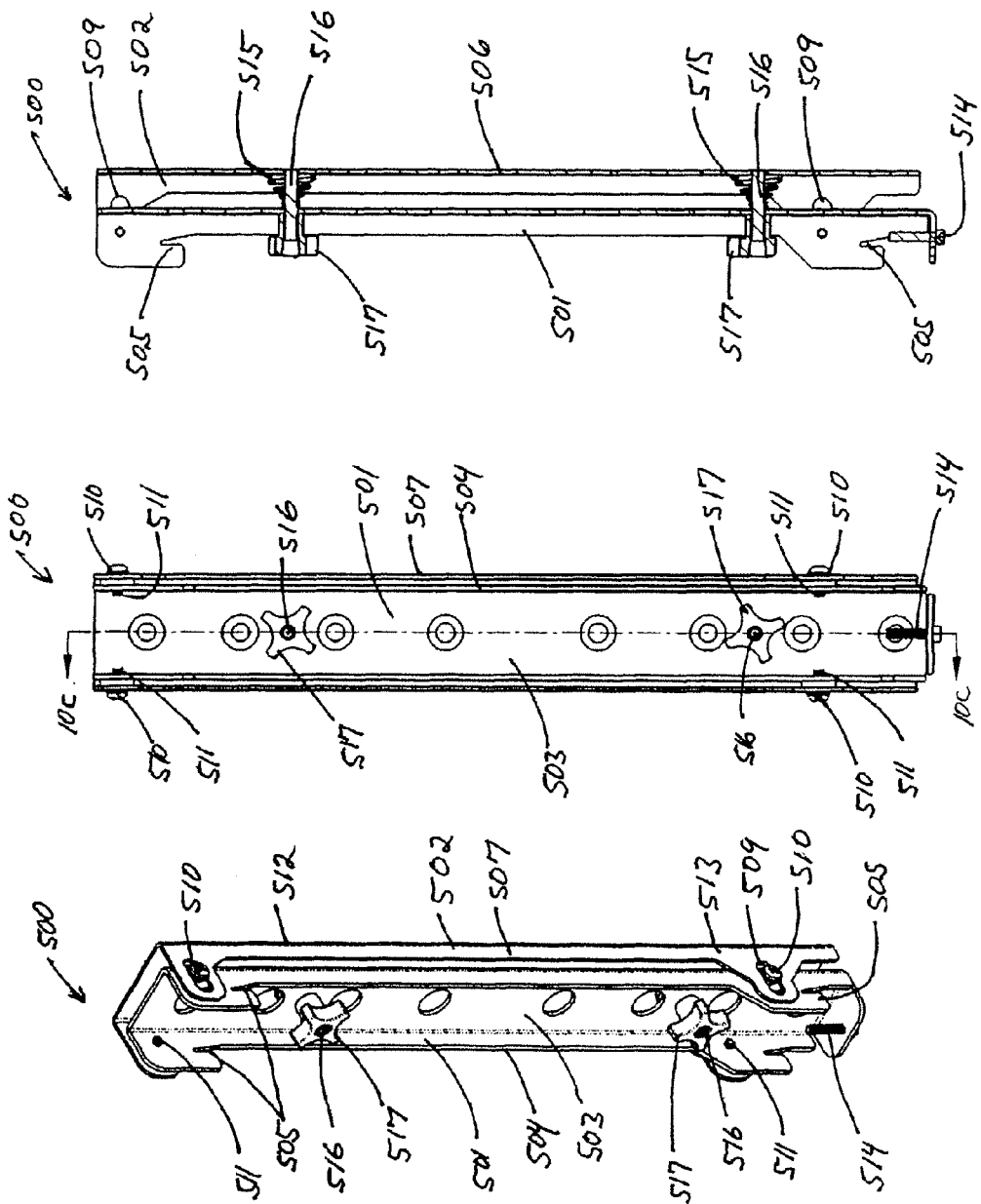

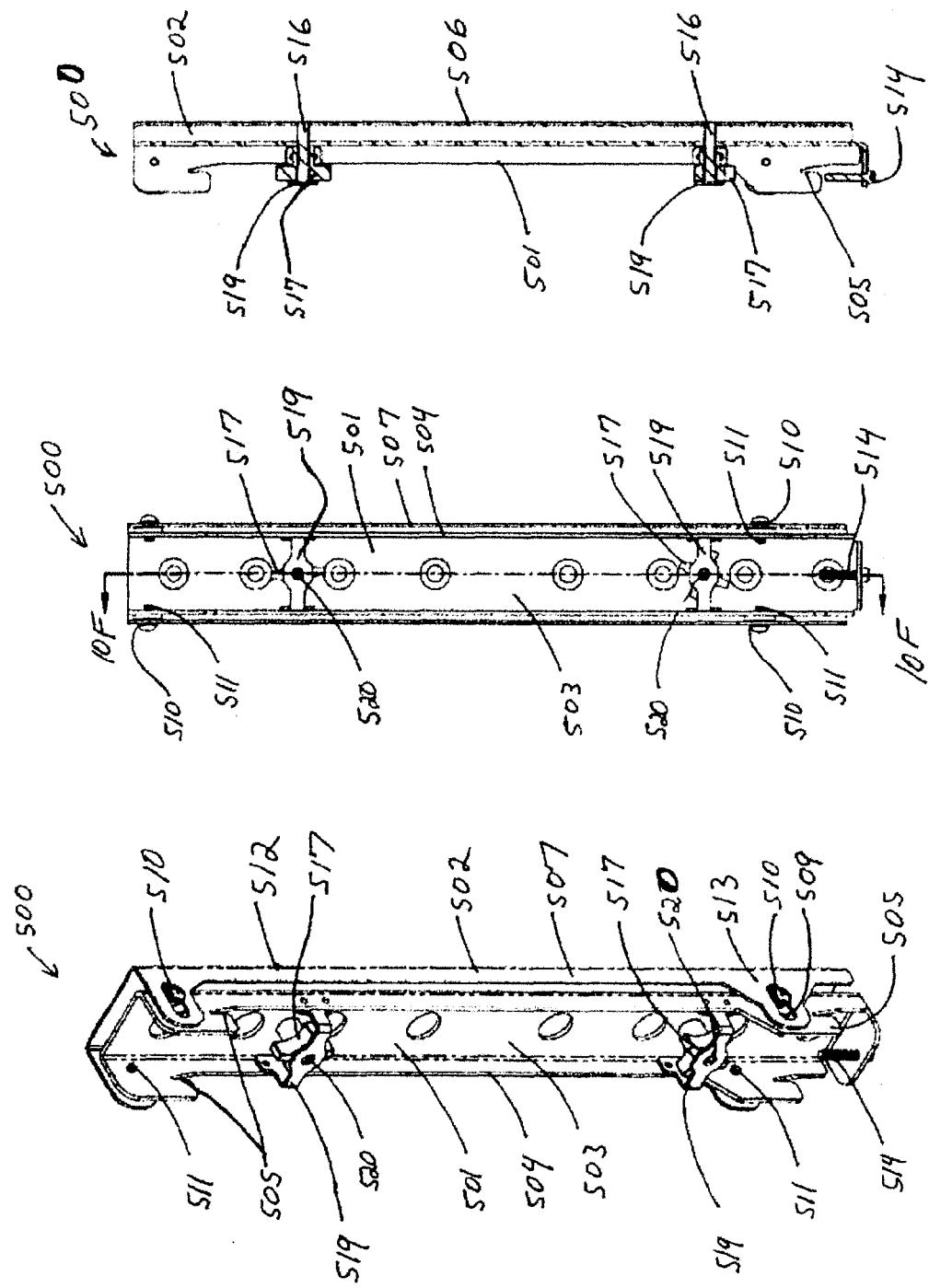

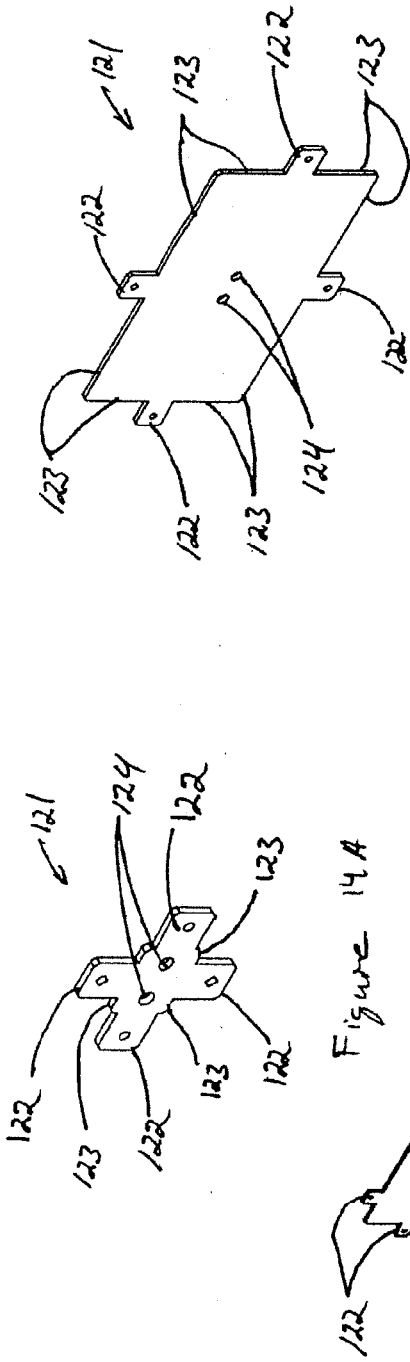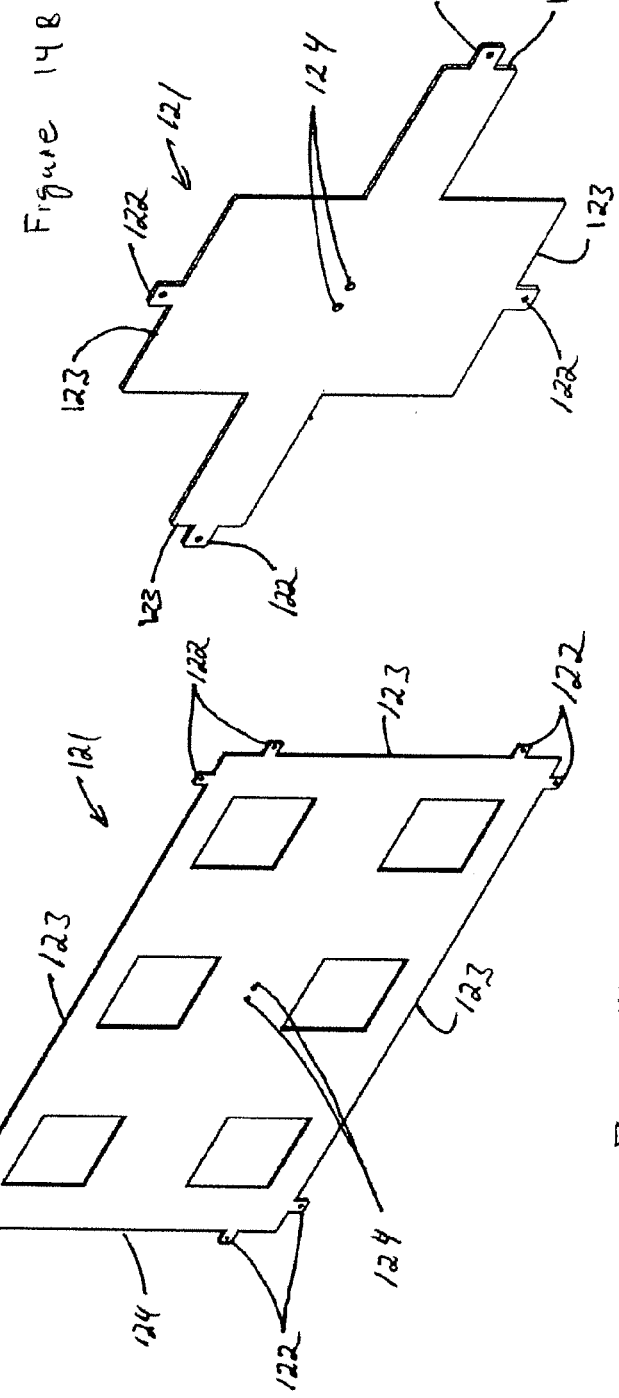

ADJUSTABALE DISPLAY MOUNT

CROSS-REFERENCE TO RELATED PATENT APPLICATIONS

This application is a continuation of U.S. patent application Ser. No. 12/704,777, filed Feb. 12, 2010. The contents of this application is incorporated herein by reference in its entirety.

FIELD OF THE INVENTION

The present invention relates generally to mounting systems for devices. More particularly, the present invention relates to adjustable mounting systems for mounting a flat-panel display and similar devices.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both commercial and residential sectors. As the prices for plasma and liquid crystal display (LCD) flat panel displays have continued to fall, and the quality for the same devices have improved, more and more businesses and individuals have purchased such devices for both home and business purposes.

One of the advantages of flat panel television units that customers have found particular appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television.

Flat panel displays, on the other hand, may be mounted directly to a wall or other surface. With these considerations in mind, there have been various attempts to develop systems that address mounting of flat panel display devices. Various adjustable display mounts have been developed that permit adjustment of the position and/or orientation of the attached display in various degrees of freedom. Some of these adjustable mounts permit a user to move aspects of the mount to reposition the location of a display in space relative to a mounting surface. Other mounts allow an attached display to pivot about an axis and/or provide for adjustment of the rotational (i.e., skew) and/or tilt orientation of the display. Such display mounts enable gross positioning of a display device to obtain a preferred viewing position and orientation for the device relative to a viewer.

SUMMARY

Various embodiments comprise systems for mounting a display device, such as an LCD and plasma flat panel display. The mounting systems are selectively adjustable to provide adjustment of the position and orientation of an attached display in several degrees of freedom. The mounting systems are configured to enable a user to make the various adjustments without the use of tools. Instead, the position and orientation of the attached display may be readily modulated by hand operation of a plurality of positioners that alone and/or in combination enable independent translation and rotation of the display relative to the mounting surface. Adjustability of the mounting system may be used to obtain an optimal viewing position/orientation of the attached display, as well as to overcome misalignment of the system when it is attached to the mounting surface and/or variation in the mounting surface.

The adjustability provided by the mounting systems according to various embodiments may be used to precisely align and orientate an attached display device in multiple degrees of freedom, making the systems particularly well suited for use in concert to mount a plurality of display devices on a surface in an array such as in a video wall application. Accordingly, each display in the video wall may be orientated and aligned relative to the mounting surface and/or each other to provide for a uniformly positioned and orientated array of display devices or to achieve particular position/orientation effects.

The mounting systems according to various embodiments have a relatively low profile, allowing the attached display to be mounted proximate the mounting surface and immediately adjacent to other displays in video wall applications. To permit repositioning and reorientating of the attached display and to service the display, a portion of the mounting system may be pulled out from the mounting surface such that the display is extended away from the mounting surface. Access to the various positioners of the mounting system is provided by placing the mounting system in this extended orientation. Additionally, access to various positioners of adjacently located mounting systems may also be provided.

In one set of embodiments, a display mount for mounting a display device to a surface comprises an adjustable display mount for mounting a display device to a mounting surface. The adjustable display mount comprises a surface bracket configured to operatively attach to a mounting surface and a first extension arm assembly operatively connected to the surface bracket that is selectively positionable between a retracted position and an extended position. The adjustable display mount further includes a mount carriage operatively connected to the extension arm assembly opposite the surface bracket. The mount carriage defines a carriage plane that is selectively positionable between a viewing position, where the carriage plane is substantially parallel to the mounting surface, and a service position where the carriage plane is angled in relation to the mounting surface. A mount bracket is adjustably coupled to the mount carriage and is selectively movable in a plane parallel to the carriage plane. A plurality of device bracket assemblies are operatively connected to the mount bracket and configured for operative attachment to the display device. Each of the plurality of device bracket assemblies includes a device bracket portion that is selectively movable in a direction substantially perpendicular to the carriage plane.

In another embodiment, a display mount for adjustably mounting a display device having a display screen to a mounting surface comprises a mount carriage configured to operatively attach to the mounting surface and a mount bracket movably coupled to the mount carriage. A first mount positioner and a second mount positioner are each coupled to the mount carriage and selectively actable on the mount bracket. The display mount further comprises a first device bracket assembly and a second device bracket assembly. Each of the first device bracket assembly and the second device bracket assembly comprise a mount engagement bracket selectively engageable with the mount bracket, a device bracket movably coupled to the mount engagement bracket and configured to operatively attach to the display device, and a first device bracket positioner and a second device bracket positioner selectively actable on the device bracket. The mount bracket is selectively movable in a first degree of freedom and a second degree of freedom by operation of at least one of the first mount positioner and the second mount positioner. Each of the device brackets is selectively movable in a third degree freedom and a fourth degree of freedom by operation of at least one of the first device bracket positioner and the second device bracket positioner.

In yet another embodiment, a system to adjust the position and orientation of at least one display device relative to a mounting surface comprises at least one display mount. The at least one display mount includes a mount carriage configured to operatively attach to the mounting surface and a mount bracket operatively coupled to the mount carriage and selectively movable in relation to the mount carriage. A plurality of device bracket assemblies are operatively coupled to the mount bracket. Each of the device bracket assemblies includes a device bracket having a device surface configured to operatively attach to a display device. The device bracket is selectively movable in relation to the mount bracket. Each of the device brackets is movable such that the device surface is independently translatable and rotatable in relation to the mount bracket.

These and other features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 10A is a perspective view of the device bracket assembly of FIG. 9, FIG. 10B is a rear plan view of the device bracket assembly of FIG. 9, FIG. 10C is a cross-sectional view of the device bracket assembly of FIG. 9, FIG. 10D is a perspective view of another embodiment of the device bracket assembly of FIG. 9, FIG. 10E is a rear plan view of the device bracket assembly of FIG. 10D, and FIG. 10F is a cross-sectional view of the device bracket assembly of FIG. 10D;

FIGS. 14A-14D are perspective views showing various configurations of spacers usable in accordance with the arrangement of FIG. 13.

DETAILED DESCRIPTION OF VARIOUS EMBODIMENTS

FIGS. 1-12 illustrate a mounting system 50 constructed in accordance with an embodiment of the present invention. The mounting system 50 is configured to attach a display device to a mounting surface such as a wall or other surface. Various portions of the mounting system 50 are selectively movable in relation to each other such that the position and orientation of the attached display may be adjusted in a plurality of dimensions or degrees of freedom. The various features of the mounting system 50 provide for independent control of translational and rotational degrees of freedom of the attached display relative to the mounting surface. Through adjustment of the various features of the mounting system 50, optimization of the position and orientation of the attached display can be achieved relative to a mounting surface and/or adjacent displays when the mounting system 50 is used in the context of a video wall application comprising an array of display devices.

Figure 1:
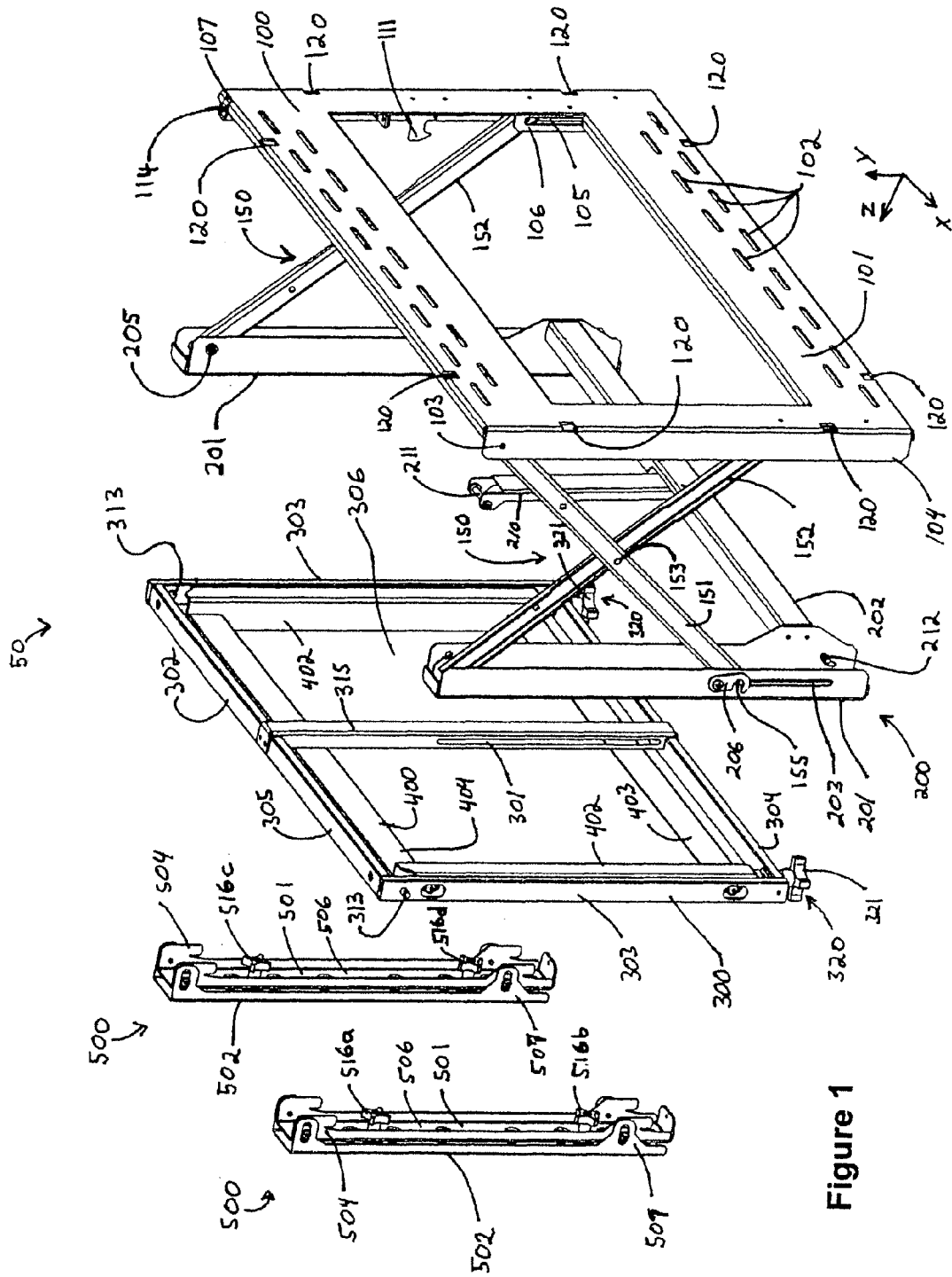
FIG. 1 is an exploded view of a mounting system constructed in accordance with an embodiment of the present invention.
Figure 2:
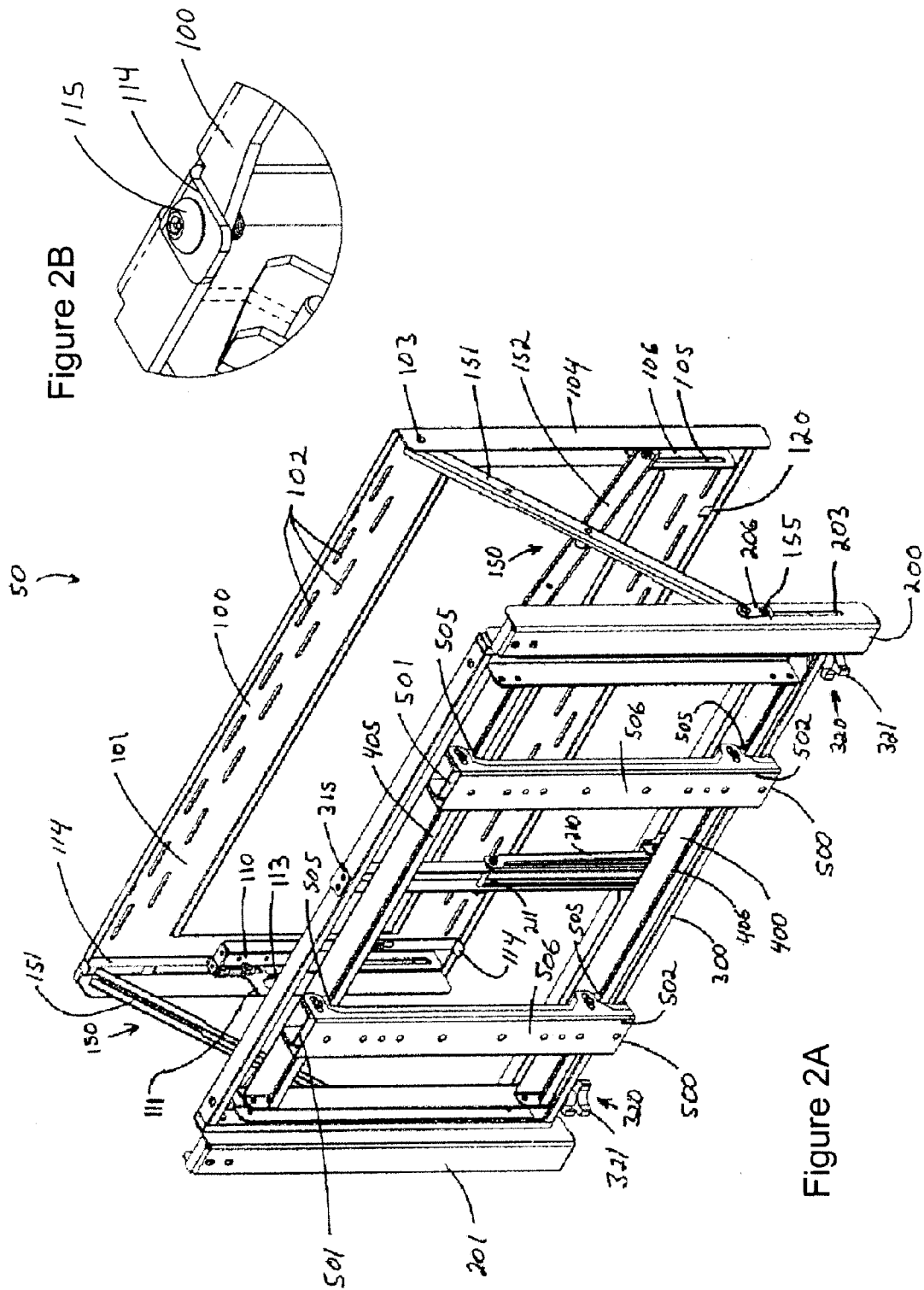
FIG. 2A is a perspective view of the mounting system of FIG. 1, showing the mounting system in an extended position.
FIG. 2B is a detailed perspective view showing a portion of the mounting system of FIG. 2A.
Figure 3:
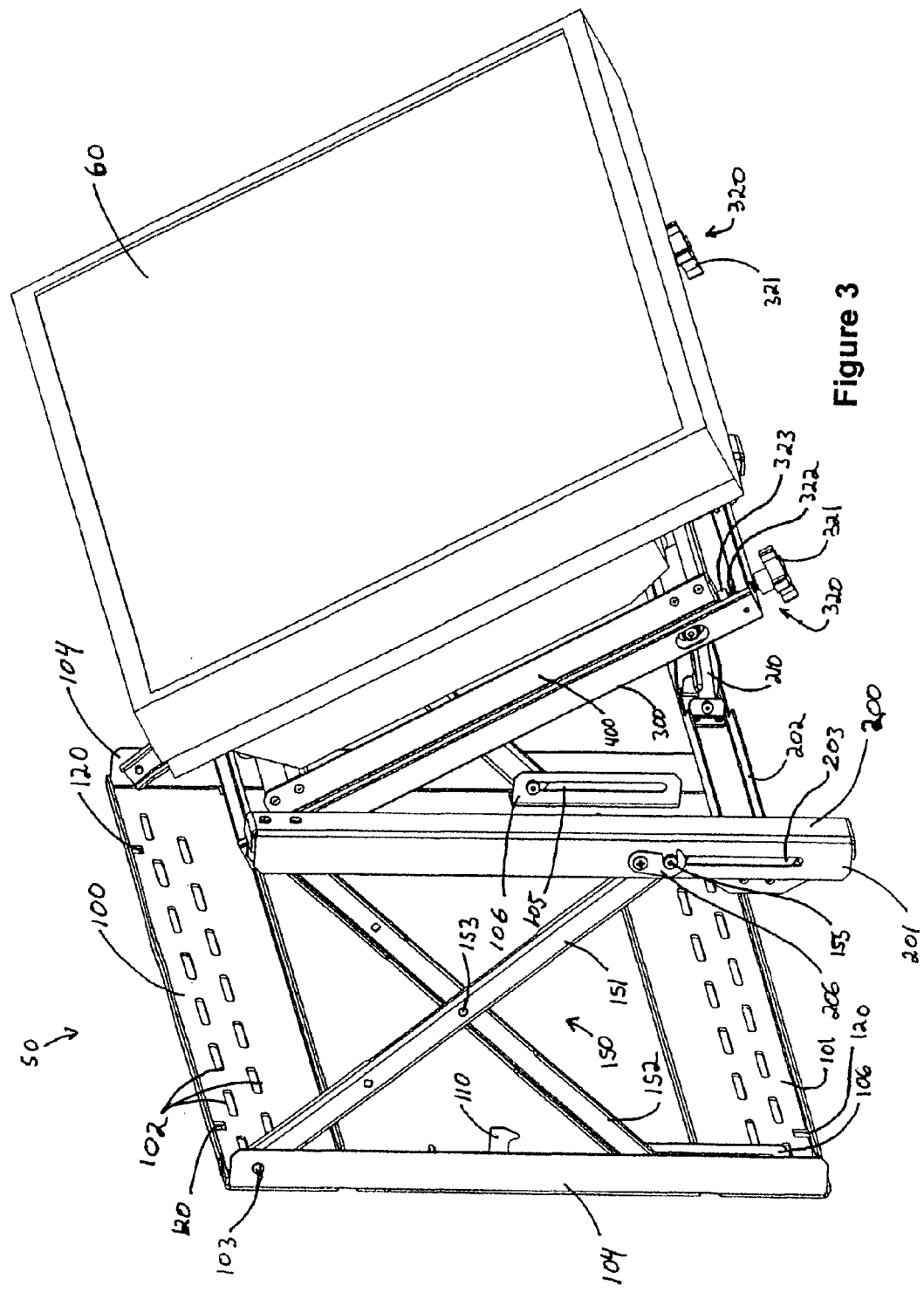
FIG. 3 is a reverse perspective view of the mounting system of FIG. 1, showing the mounting system in an extended and service position with an attached display device.

With reference to FIGS. 1-3, the mounting system 50 comprises a surface bracket 100 configured for operative attachment to a mounting surface, an extension bracket assembly 200, and at least one arm assembly 150 movably coupling the surface bracket 100 with the extension bracket assembly 200. The extension bracket assembly 200 is selectively translatable in relation to the surface bracket 100 along an axis substantially perpendicular to the mounting surface via operation of the arm assembly 150 between a retracted position and an extended position. The mounting system 50 further includes a mount carriage 300 rotatably coupled to the extension bracket assembly 200 and a mount bracket 400 movably coupled to the mount carriage 300. The mount carriage 300 is rotatable between a viewing position and a service position about an axis substantially parallel to the mounting surface. The mount bracket 400 is selectively movable in relation to the mount carriage 300 in a plane substantially parallel to the mounting surface when the mount carriage 300 is in the viewing position. The mounting system 50 further includes one or more of a device bracket assembly 500 configured for operative attachment to a display device 60 and engageable with the mount bracket 400. A portion of the device bracket assembly 500 is selectively movable out of a plane substantially parallel to the mounting surface when the mount carriage 300 is in the viewing position.

The surface bracket 100 includes an attachment surface 101 configured for securement to a mounting surface such as a wall or other substantially vertical surface. The attachment surface 101 includes a plurality of surface bracket openings 102 to receive connecting elements (not shown) such as bolts, screws, and/or other fasteners, that may be used to attach the surface bracket 100 to the mounting surface. As shown, the plurality of surface bracket openings 102 may comprise a plurality of horizontal slots for engagement with, for example, regularly spaced wall studs within the mounting surface. The surface bracket 100 may further include a plurality of spacer engagement features 120. The plurality of spacer engagement features 120 may be disposed proximate the periphery of the surface bracket 100. As shown in FIG. 1, each of the plurality of spacer engagement features 120 comprises an aperture in the surface bracket 100. As explained more fully below, the apertures are configured to receive a portion of a spacer that may be used to separate and align a plurality of the mounting systems 50 with respect to one another on the mounting surface. The plurality of spacer engagement features 120 are not limited to the depicted apertures, but may be otherwise constructed and may include a tab, protrusion, or other features.

A plurality of engagement features are associated with the surface bracket 100 that movably couple the arm assembly 150 to the surface bracket 100. As depicted in FIG. 1, the mounting system 50 includes a pair of the arm assemblies 150 movably coupled at each end of the surface bracket 100. However, in other embodiments more or fewer of the arm assemblies 150 may be employed. The arm assembly 150 is also not limited to the depicted embodiment, but can comprise other configurations apparent to those in the art. Still further, in various embodiments, the arm assembly 150 can be eliminated. Each of the depicted arm assemblies 150 comprise a first arm 151 and a second arm 152 pivotally coupled to each other by a pin 153 proximate the respective midpoints of the first arm 151 and the second arm 152. As shown in FIG. 1, each of the first arms 151 is pivotally coupled at a first pivot 103 located on a flange 104 extending substantially normal from the attachment surface 101 at each end. Each of the second arms 152 is slidingly coupled with the surface bracket 100. As depicted in FIGS. 1 and 2, the second arm 152 is slidingly coupled with a second arm guide 105 associated with an arm engagement bracket 106 coupled to the attachment surface 101. As shown, the second arm guide 105 comprises an elongated slot in the arm engagement bracket 106. However, in other embodiments, the second arm guide 105 may comprise other features such as a rail, protrusion, or other guiding structure and may be associated with, for example, the arm engagement bracket 106, attachment surface 101, and/or the flange 104.

As explained in greater detail below, the arm assembly 150 expands and retracts in relation to the surface bracket 100 in a direction substantially perpendicular to the attachment surface 101 with the simultaneous rotation of the first arm 151 with the first pivot 103 and sliding of the second arm 152 with the second arm guide 105. A portion of the mounting system 50 may thus be selectively positioned between an extended position where the mount bracket 400 is extended away from the surface bracket 100, as depicted in FIGS. 2A and 3, and a refracted position depicted in FIG. 4, where the mount bracket 400 is proximate the surface bracket 100. The retracted position may be a viewing position and the extended position may be a service position. The service position provides access to portions of the mounting system 50 and allows for adjustment of the position and orientation of the attached display device 60, or as later explained, an adjacent display device. The service orientation also provides access to the rear of the attached display device 60 for connecting/disconnecting various cables to the device and/or conducting other service activities.

Figure 5:
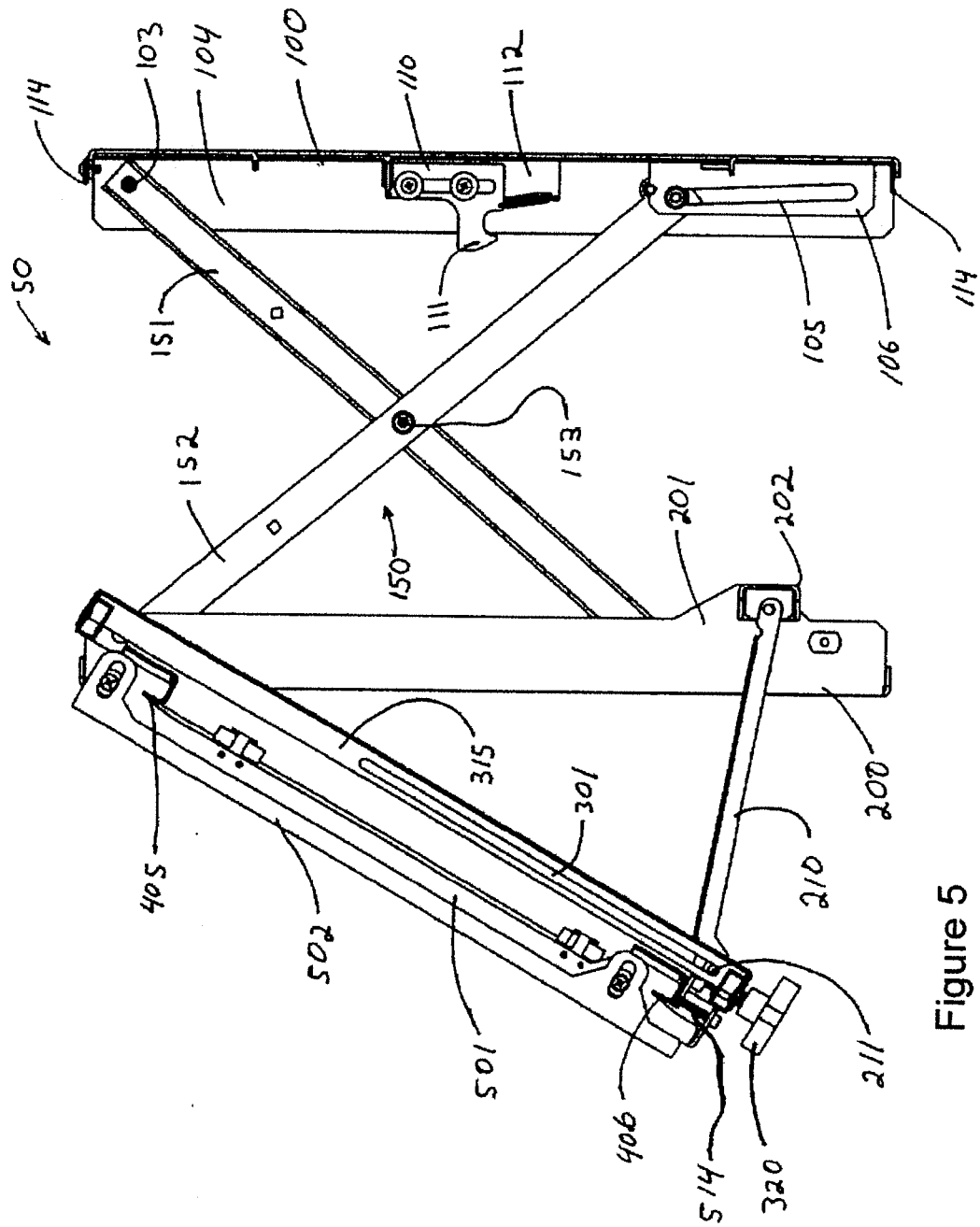
FIG. 5 is a right side cross-sectional view of the mounting system of FIG. 1, showing the mounting system in an extended and service position.

With reference to FIGS. 2A and 5, the surface bracket 100 may further include one or more arm lock assemblies 110. Each arm lock assembly 110 is selectively engageable with a portion of the mounting system 50 when in the retracted position. Various configurations of the arm lock assembly 110 may be constructed. For example, and as shown in FIG. 5, the arm lock assembly 110 is operatively connected to surface bracket 100 proximate one of the arm assemblies 150 and includes a movable latch 111 that is selectively engageable with the pin 153 that pivotally couples the first arm 151 and the second arm 152. The movable latch 111 is slidingly coupled to a latch plate 112 that is connected to the flange 104. The movable latch 111 is selectively movable relative to the latch plate 112 between an engaged position and a disengaged position. The arm lock assembly 110 may include a lock biasing element 113 that urges the movable latch 111 into the engaged position to prevent inadvertent release of the pin 153 when engaged. In the depicted embodiment, the lock biasing element 113 comprises a spring.

The arm lock assembly 110 may further include one or more of a release lever 114 configured to disengage the movable latch from the pin 153. The release lever 114 comprises an elongated member coupled to the movable latch 111 and extending to a location proximate the periphery of the surface bracket 100. The surface bracket 100 may include a release lever opening 107 along a top and/or bottom edge configured to permit the release lever 114 to pass outside the surface bracket 100 for easier access to an operator. With reference to FIG. 2B, a security fastener 115 associated with the release lever 114 may further be included. As shown, the security fastener 115 is received by the release lever 114 and is selectively engageable with the surface bracket 100. When engaged with the surface bracket 100, the security fastener 115 substantially prevents operation of the release lever 114, thereby maintaining the mounting system 50 in the retracted position. Thus, the security fastener 115 may serve as a theft deterrent device to prevent disengagement of the display device from the mounting system 50. In other embodiments, the release lever 114 may be accessible via the end of the surface bracket 100 proximate the flange 104.

As shown in FIGS. 1 and 2, the extension bracket assembly 200 is coupled to the surface bracket 100 via the arm assembly 150. An end pillar 201 is located at each end of the extension bracket assembly 200 and comprises an elongated member generally having a "C" shaped cross-section. A cross-bar 202 operatively connects the end pillars 201. Each of the end pillars 201 is associated with an arm assembly 150. The first arm 151 is slidingly associated with a first arm guide 203 opposite the first pivot 103. As depicted, the first arm guide 203 comprises an elongated slot disposed in a lower portion of the end pillar 201. However, similar to the second arm guide 105, the first arm guide 203 may be otherwise constructed. The second arm 152 is pivotally coupled to an upper portion of the end pillar 201 at a second pivot 205 opposite the second arm guide 105. It will be appreciated, that various arrangements of the arm assembly 150 may be constructed, including reversing the configuration of the first pivot 103, the second pivot 205, the first arm guide 203 and the second arm guide 105 with respect to the surface bracket 100 and the extension bracket assembly 200.

At least one of the end pillars 201 may include an extension lock 206 selectively engageable with the associated arm assembly 150 when the mounting system 50 is in the extended position. For example, FIG. 1 shows the extension lock 206 engaged with a portion of the first arm 151 proximate the first arm guide 203. As depicted, the extension lock 206 comprises a hook engageable with an arm carrier 155 received by the first arm guide 203. When engaged with the arm carrier 155, the extension lock 206 prevents sliding of the first arm 151 and, thus substantially prevents the mounting system 50 from being moved from the extended position to the retracted position. The extension bracket assembly 200 is readily translated toward the surface when the extension lock 206 is disengaged from the arm assembly 150 such as shown in FIG. 4.

Figure 4:
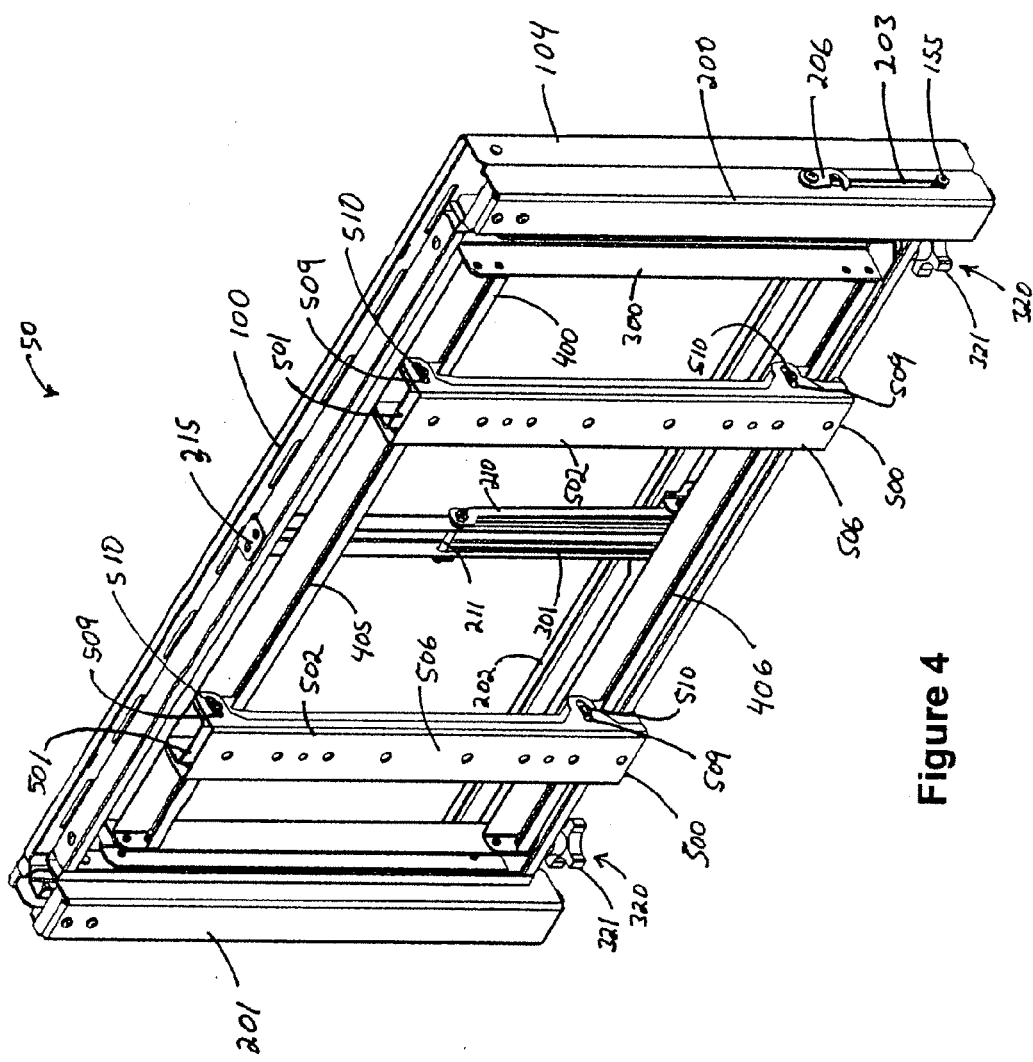
FIG. 4 is a perspective view of the mounting system of FIG. 1, showing the mounting system in a retracted viewing position.

With reference to FIGS. 1, 2, 4 and 5, the extension bracket assembly 200 may further include a service strut 210. At one end, the service strut 210 is rotatably coupled to the cross-bar 202. The opposite end of the service strut 210 is slidingly coupled to the mount carriage 300 via a service strut carrier 211 associated with a service strut guide 301 disposed on a central pillar 315 of the mount carriage 300. As shown in FIGS. 2A and 4, the service strut 210 is substantially vertical when the mount carriage 300 is in the viewing position and extended position. On the other hand, when the mounting system 50 is in the extended position and when the lower portion of the mount carriage 300 is lifted to place the mount carriage 300 in the service position of FIGS. 3 and 5, the service strut carrier 211 guides the service strut 210 to a substantially horizontal orientation. In the substantially horizontal orientation, the service strut 210 maintains the mount carriage 300 in the elevated service position such that various adjustments to the mounting system 50 and/or the attached display device 60 may be made. The extension bracket assembly 200 may further include a locking pin 212. As shown in FIG. 1, the locking pin 212 is selectively engageable with the mount carriage 300. When engaged, the locking pin 212 prevents the mount carriage 300 from being moved into the service position.

Figure 7:
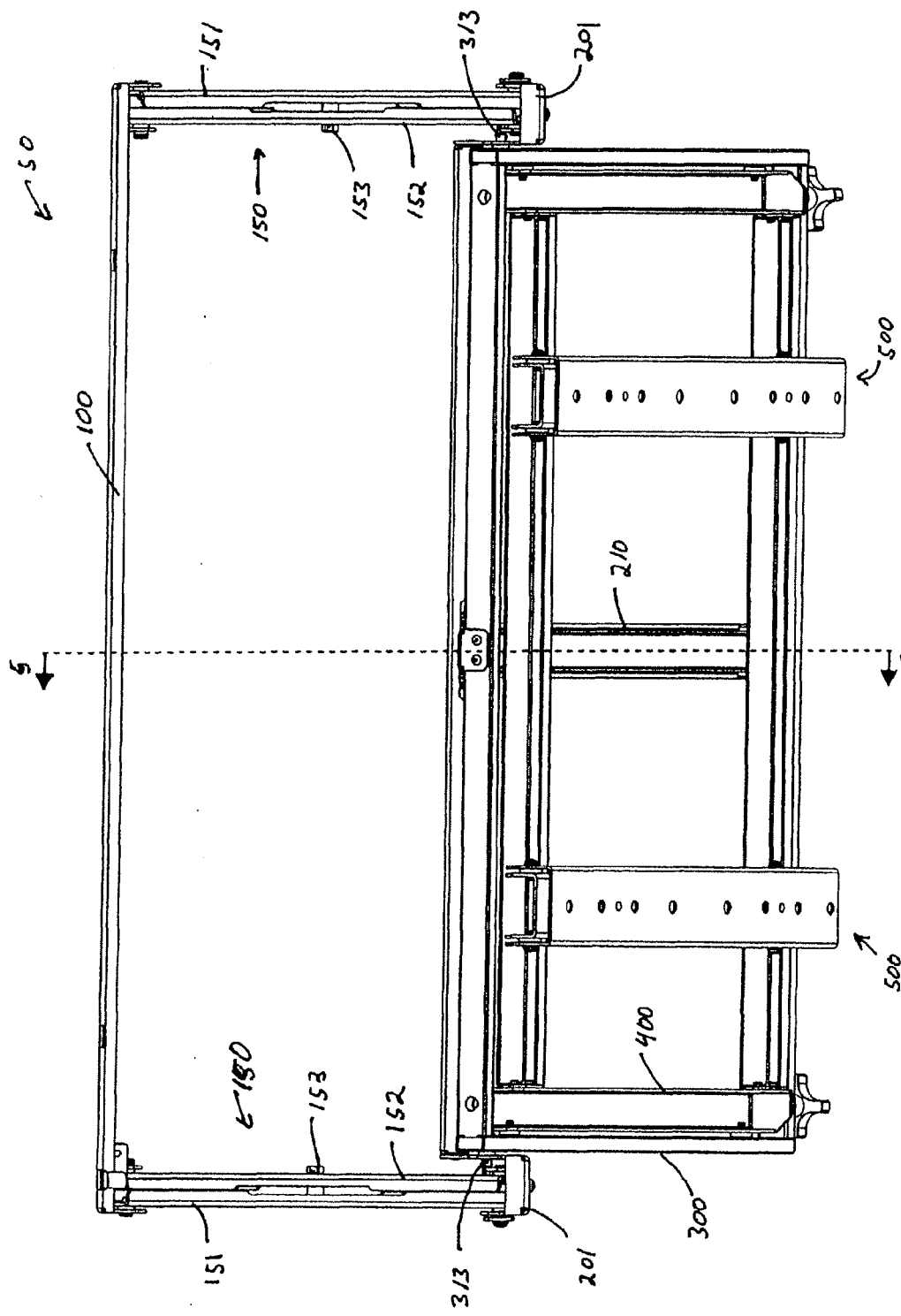
FIG. 7 is a top plan view of the mounting system of FIG. 1, showing the mounting system in an extended and service position.
Figure 8:
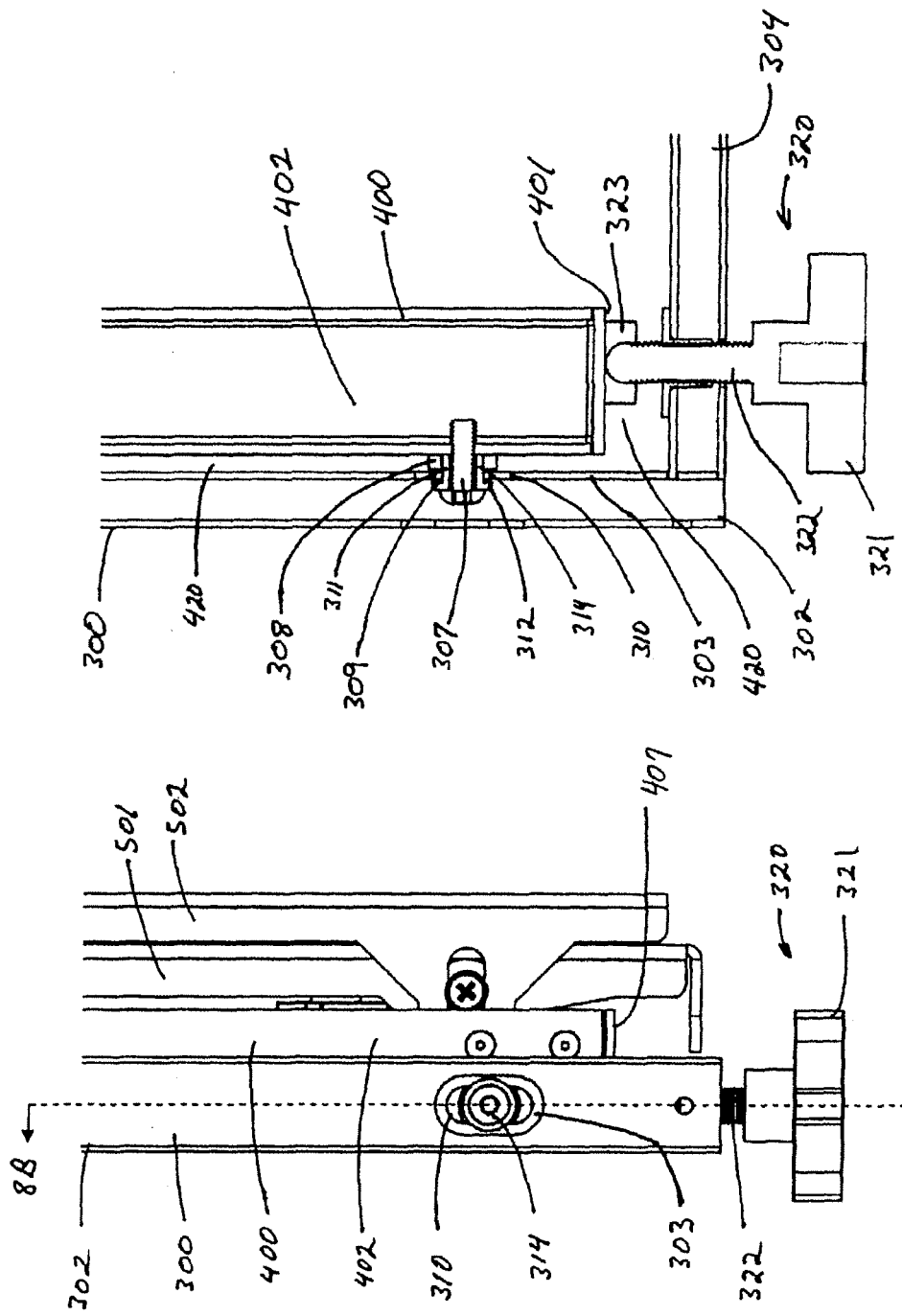
FIG. 8A is left side view showing a portion of the mount carriage, a mount bracket, and a device bracket assembly of the mounting system of FIG. 1.
FIG. 8B is a cross-sectional view of the portion of the mount carriage, the mount bracket, and the device bracket assembly of FIG. 8A.

The mount carriage 300 is rotatably coupled to an upper portion of the extension bracket assembly 200. As depicted in FIGS. 1 and 7, each end of the mount carriage 300 includes an engagement portion 313 that is associated with an end pillar 201 of the extension bracket assembly 200. As shown in FIGS. 2A and 3, the lower portion of the mount carriage 300 is selectively rotatable between a lowered position that is the viewing position when the mounting system 50 is in a retracted position and the elevated service position. Thus, the mount carriage 300 is rotated with respect to the extension bracket assembly 200 about the engagement portions 313. In the viewing position the mount carriage 300 defines a plane substantially parallel to the mounting surface. In the service position, the lower portion of the mount carriage 300 is rotated away from and raised from the extension bracket assembly 200 about an axis substantially parallel to the mounting surface.

Figure 6:
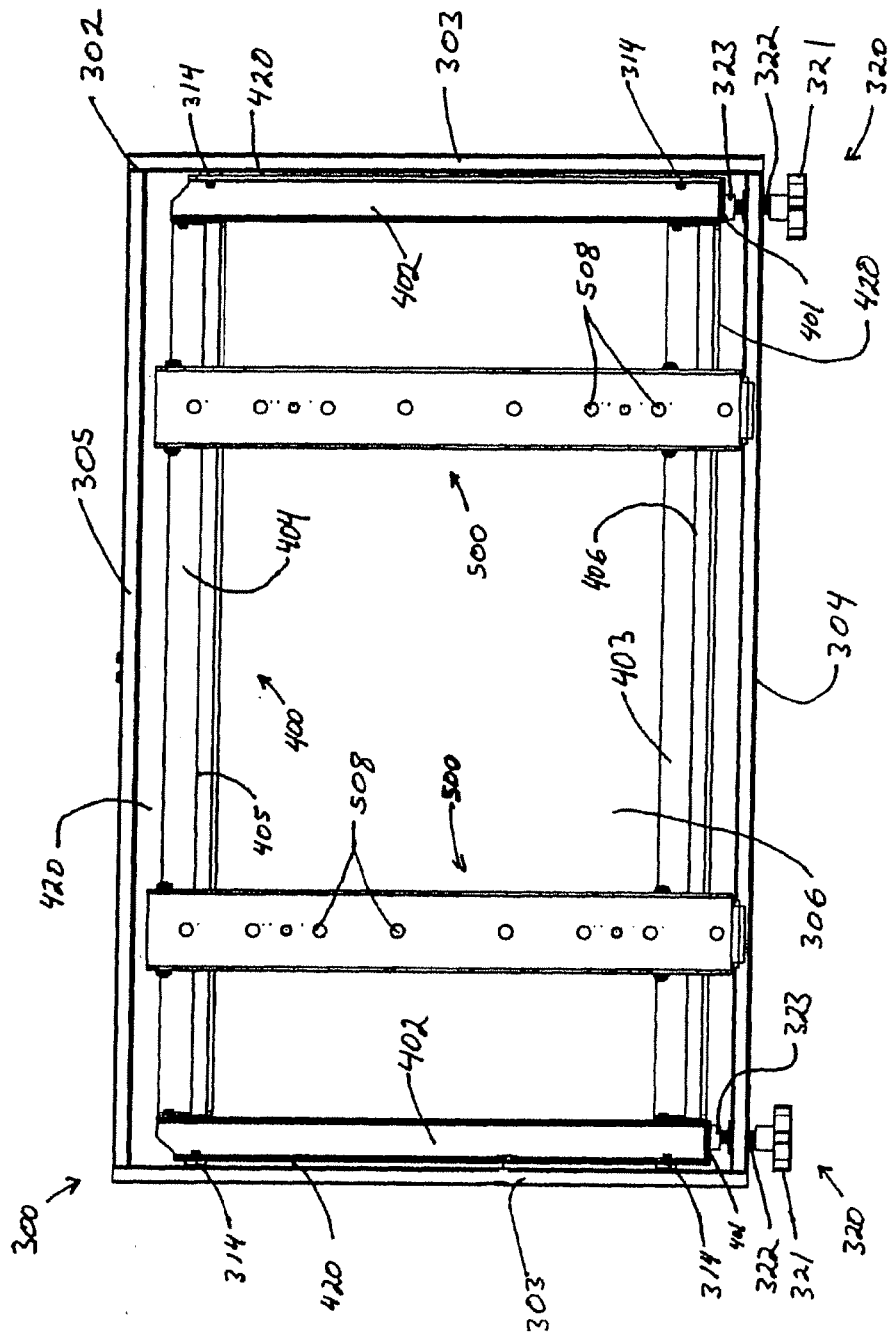
FIG. 6 is a front plan view of a mount carriage, a mount bracket, and a pair of device bracket assemblies of the mounting system of FIG. 1.

As depicted in FIGS. 1 and 6, the mount carriage 300 generally comprises a frame 302 having end portions 303 coupled by a lower frame member 304 and an upper frame member 305. The frame 302 defines a carriage opening 306 that at least partially receives the mount bracket 400. The carriage opening 306 is generally larger than the mount bracket 400. That is, the carriage opening 306 has a greater length and width than the respective length and width of the mount bracket 400. As such, and as shown in FIG. 6, an adjustment gap 420 is generally provided about the periphery of the mount bracket 400 between portions of the frame 302 of the mount carriage 300. However, in other embodiments, the configuration may be reversed such that the mount carriage 300 is substantially received within the mount bracket 400. In still other embodiments, the mount carriage 300 and mount bracket 400 may otherwise be coupled. For example, the mount bracket 400 may be positioned in front and/or behind the mount carriage 300.

With reference to FIGS. 6, 8A and 8B, the mount bracket 400 is movably coupled to the mount carriage 300 by a plurality of connecting element assemblies 314. Accordingly, the mount bracket 400 effectively floats and is movable within the carriage opening 306 limited by the adjustment gap 420. As such, the location of the mount bracket 400 is selectively movably with respect to the mount carriage 300 substantially in the plane defined by the carriage opening 306. The location of the mount bracket 400 within the carriage opening 306 is selectively adjustable by operation of a mount positioner 320. As explained in more detail below, the mounting system 50 includes one or more of the mount positioners 320 movably coupled to the mount carriage 300 and actable on the mount bracket 400.

With reference to FIGS. 8A and 8B, each of the connecting element assemblies 314 comprise a connecting element 307 such as a bolt or other fastener, a bushing 308 and a slide 309. The frame 302 includes a plurality of carriage guides 310 configured to engage a portion of the connecting element assembly 314. In the depicted embodiment, the plurality of carriage guides 310 are openings located on the end portions 303 proximate each of the four corners of the frame 302. The connecting element 307 is secured to the mount bracket 400 and received by the carriage guides 310. The slide 309 includes a shank portion 311 that receives the connecting element 307 and a flange portion 312 that engages the end portion 303 and retains the connecting element assembly 314 in the carriage guide 310. The bushing 308 is disposed between the end portion 303 and the mount bracket 400, receives a portion of the shank portion 311, and fills at least a portion of the region defined by the adjustment gap 420. The bushing 308 may be constructed of a resilient material that is deformable to permit lateral and rotational adjustment of the mount bracket 400 with respect to the mount carriage 300.

The configuration of the connecting element assemblies 314 allows for translation and rotation of the mount bracket 400 within the carriage opening 306 substantially in the plane defined by the carriage opening 306. As shown in FIG. 8A, each of the plurality of carriage guides 310 may comprise elongated slots that permit the connecting element assembly 314 to slide, thereby allowing vertical adjustment of the mount bracket 400 with respect to the mount carriage 300. Accordingly, the vertical position of the mount bracket 400 and an attached display device may be adjusted by sliding the connecting element assemblies 314 relative to the carriage guides 310, thereby moving the mount bracket 400 relative to mount carriage 300. Additionally, the rotational orientation, or skew, of the mount bracket 400 and the attached display device may be adjusted by interaction of one or more of the connecting element assemblies 314 relative to the carriage mount 300. The connecting element assemblies 314 may also be used to secure the lateral location of the mount bracket 400. As shown, the connecting element 307 is freely rotatable within the flange portion 312 and is threadedly engaged with a side portion 402 of the mount bracket 400. By adjusting one or more of the connecting elements 307, the mount bracket 400 may be drawn toward an end portion 303 and may also be substantially secured in relation to the mount carriage 300 by adjusting a plurality of the connecting elements 307.

With reference to FIGS. 1, 4 and 6, the mount bracket 400 generally comprises a frame with side portions 402 connected by a lower channel 403 and an upper channel 404. The upper channel 404 includes an upper engagement member 405 that runs along a length of the upper channel 404. Similarly, the lower channel 403 includes a lower engagement member 406. FIG. 6 depicts a pair of the mount positioners 320 associated with the lower frame member 304 and disposed proximate the end portions 303. Each of the mount positioners 320 includes a handle 321 attached to one end of a positioning shaft 322 and a positioning interface 323 coupled to the opposite end of the positioning shaft 322. The positioning shaft 322 is threadedly engaged with an opening in the lower frame member 304. Accordingly, rotation of the handle 321 turns the positioning shaft 322 and translates the positioning interface 323 in a substantially vertical direction in relation to the mount carriage 300.

By operation of the mount positioner 320, the positioning interface 323 is thus actable with a lower surface 401 of the mount bracket 400 to selectively move the mount bracket 400. The mount bracket 400 is movable in a first degree of freedom that translates the mount bracket 400 substantially parallel to the plane of the carriage opening 406 by operation of the pair of mount positioners 320. As shown in FIGS. 1 and 6, the first degree of freedom is orientated substantially vertically. The mount positioners 302 may also be operated to move the mount bracket 400 in a second degree of freedom that is a rotation substantially parallel to the plane of the carriage opening 306. Rotation of the mount bracket 400 is achieved by operating one of the mount positioners 320 or oppositely operating the mount positioners 320 such that one of the positing interfaces 323 is displaced away from the lower frame member 304 and the other positioning interface 323 is displaced toward the lower frame member 304. By operation of at least one mount positioner 320, the mount bracket 400 is rotated in a plane substantially parallel to the carriage opening 406. When the mounting system 50 is in the viewing position of FIG. 4, this rotation is substantially parallel to the mounting surface and adjusts the rotation or skew of the attached display device. The positioning interfaces 323 may remain engaged with the lower surface 401 to assist in maintaining the position of the mount bracket 400.

Thus, by adjustment of one or more of the mount positioners 320, the vertical position and/or or the skew, i.e., rotation of the mount bracket 400 in the plane of the carriage opening 306, may be altered. For example, in the depicted embodiment that includes the pair of mount positioners 320, operation of the two mount positioners 320 will result in a substantially vertical translation of the mount bracket 400 in relation to the mount carriage 300. It should be noted that adjustment of the two mount positioners 320 need not be simultaneous and that substantially vertical adjustment may be achieved by sequential adjustment of each of the mount positioners 320. Operation of one of the mount positioners 320 will result in tipping, either upper or down, depending on the direction of rotation of the handle 321, of the side of the mount bracket 400 proximate the mount positioner 320 that is adjusted, imparting a rotational skew to the mount bracket 400. Operation of the mount positioners 320 may be accomplished by hand and provides toolless adjustment of the vertical position and rotation substantially in the plane of the carriage opening 306 such that the position and orientation of the attached display is readily changeable in the first and the second degrees of freedom without the need for tools.

With reference to FIGS. 1, 9 and 10A-10F, the mounting system 50 further includes at least one device bracket assembly 500. The device bracket assembly 500 defines a principal axis that is orientated in a substantially vertical direction when the mounting system 50 is in the viewing position. The device bracket assembly 500 includes a mount engagement bracket 501 and a device bracket 502 movably coupled to the mount engagement bracket 501. The mount engagement bracket 501 is selectively engageable with the mount bracket 400. The device bracket 502 is configured for operative attachment to the display device. The mount engagement bracket 501 includes a mount surface 503 and mount bracket sides 504 that extend substantially perpendicular from the mount surface 503. The mount bracket sides 504 may include a plurality of engagement portions 505. Each of the plurality of engagement portions 505 is configured to engage one of the upper engagement member 405 and the lower engagement member 406. In an embodiment, each of the plurality of engagement portions 505 comprises a hook slidingly engageable with one of the upper engagement member 405 and the lower engagement member 406. Lateral adjustment of one or more of the device bracket assemblies 500 along the upper engagement member 405 permits for horizontal adjustment of the position of the attached display device and further adapts the mounting system 50 for attachment to display devices of various sizes and/or mounting configurations.

Figure 9:
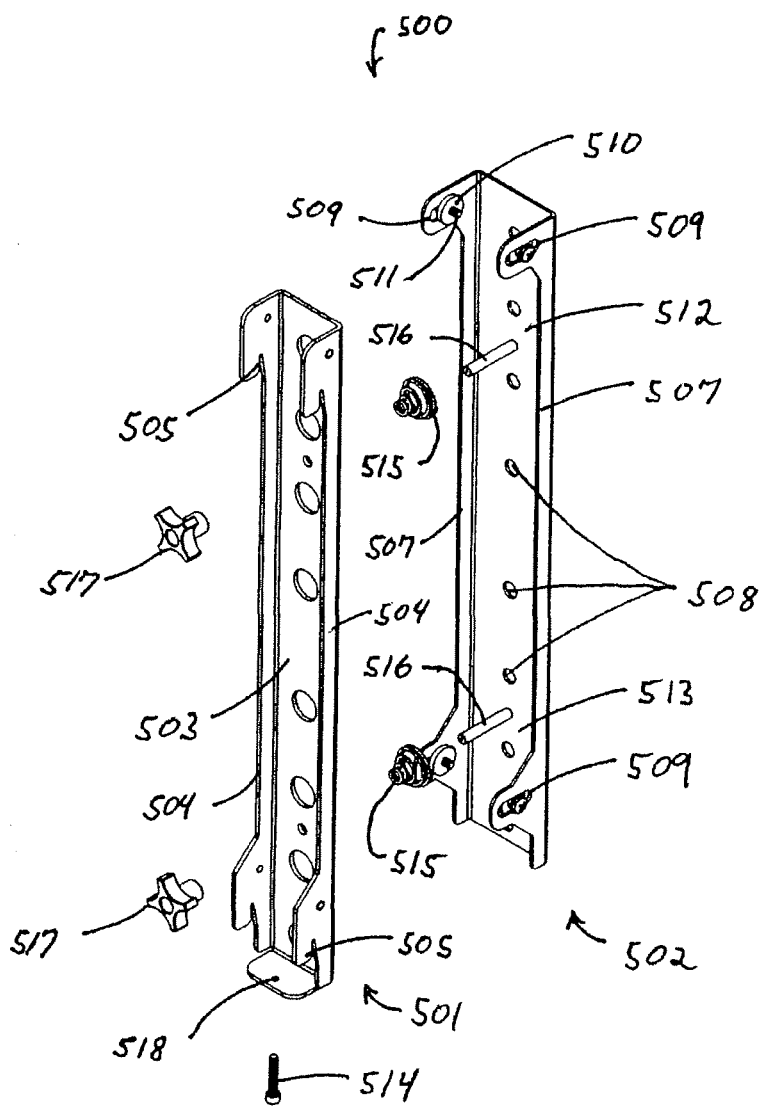
FIG. 9 is an exploded view of a device bracket assembly included in the mounting system of FIG. 1.

Each of the device bracket assemblies 500 may be substantially fixed in relation to the mount bracket 400 by engagement of a security element 514 with the mount bracket 400. As depicted in FIG. 9, the mount engagement bracket 501 includes a security element opening 518 configured to receive the security element 514. As shown in FIGS. 9 and 10A-10F, the security element 514 comprises a bolt threadedly engaged in the security element opening 518. However, in other embodiments the security element may comprise a latch, locking member, pin or other features and combinations thereof that may be used to selectively engage the mount bracket 400 or other portion of the mounting system 10. The security element 514 is selectively engageable with a periphery portion 407 exposed on the lower surface 401 of the mount carriage 400 depicted in FIG. 8A. The device bracket assembly 500 is substantially prevented from inadvertent dislodgment from the carriage mount 400 or movement by engagement of the security element 514 with the periphery portion 407.

The device bracket 502 includes a device surface 506 and device bracket sides 507 extending substantially perpendicular from the device surface 506. The display device may be mounted to the device surface 506, which can include a plurality of device openings 508 configured to receive connecting elements engageable with the display device. Alternatively, an adapter plate (not shown) may be attached to the device and coupled to the device surface 506. A plurality of device bracket guides 509 are disposed on the device bracket sides 507 in a substantially horizontal orientation. As shown in FIG. 9, pairs of device bracket guides 509 are oppositely located on the device bracket sides 507 proximate an upper portion 512 and a lower portion 513 of the device bracket 502.

With reference to FIGS. 10A-10F, each of the plurality of device bracket guides 509 comprises an elongated slot configured to engage a bracket carrier assembly 510 that movably couples the device bracket 502 with the mount engagement bracket 501. Each of the bracket carrier assemblies 510 includes a bracket connecting element 511 that slidingly engages at least one of the device bracket guides 509. As shown, each of the bracket connecting elements 511 is threadedly engaged with one of the mount bracket sides 504 of the mount engagement bracket 501. However, in other embodiments, the bracket connecting element 511 may be rotatably or slidably coupled with the mount engagement bracket 501. In various embodiments, the bracket connecting element 511 may span the width of the mount engagement bracket 501 and be associated with the pair of device bracket guides 509 oppositely located on the device bracket sides 507.

The position of the device bracket 502 is thus selectively movable in relation to the mount engagement bracket 501 as constrained by the movement of the bracket carrier assemblies 510. With reference to FIGS. 9 and 10C, the device bracket assembly 500 may further include a bracket biasing element 515 retained between the device surface 506 and the mount surface 503. As depicted, a pair of bracket biasing elements 515 are included, with one bracket biasing element 515 disposed proximate the upper portion 512 and the other disposed proximate the lower portion 513 of the device bracket 502. In an embodiment, each of the bracket biasing elements 515 comprises a compression spring. In another embodiment of the device bracket assembly 500 (depicted in FIGS. 10D-10F), the device bracket assembly 500 includes a retention member 519 coupled to the mount engagement bracket 501. As shown, each of the device bracket assemblies 500 includes a pair of the retention members 519. Each of the retention members 519 is associated with a bracket positioner 516, which, as explained below, operates to adjust the position of the device bracket 502. In this embodiment, the bracket biasing elements 515 described in relation to the embodiment depicted in FIGS. 9-10C may be eliminated.

The device bracket assembly 500 further includes a pair of bracket positioners 516 associated with the device bracket 502 and the mount engagement bracket 501. In the depicted embodiment, each of the bracket positioners 516 comprises a rod fixedly attached at one end to the device bracket 502 and slidingly received through an opening in the mount engagement bracket 501. The bracket positioner 516 may further include a bracket positioner handle 517 threadedly attached to the rod opposite the device bracket 502 and actable on the mount engagement bracket 501. Rotation of the bracket positioner handle 517 causes the bracket positioner handle 517 to move along the bracket positioner 516 toward or away, depending on the direction of rotation, the device bracket 502.

Movement of the bracket positioner handle 517 toward the device bracket 502 causes the bracket positioner 516 to be drawn through the opening of the mount engagement bracket 501, thereby decreasing the distance between at least a portion of the mount engagement bracket 501 and the device bracket 502. Movement of the bracket positioner handle 517 away from the device bracket 502 causes the bracket biasing element 515 in the embodiment of FIGS. 9-10C to displace the device bracket 502 away from the mount engagement bracket 501, thereby increasing the distance between at least a portion of the mount engagement bracket 501 and the device bracket 502. Similarly, in the embodiment depicted in FIGS. 10D-10F, the retention member 519 operates on the bracket positioner handle 517 associated with the respective bracket positioner 516 to adjustably move the device bracket 502. The retention member 519 includes a retention member opening 520 configured to permit passage of the rod of the bracket positioner 516 during adjustment of the bracket positioner handle 517.

The described embodiment permits the device brackets 502 and an attached display device to be moved in a third degree of freedom that is a translation in a direction substantially perpendicular to the carriage opening 306. Operation of one or more of the bracket positioners 516 also moves the attached display device in additional degrees of freedom, including pivoting and tilting the display device relative to the carriage opening 306 or the mounting surface. Translation of the attached display device is accomplished by moving the upper portion 512 and the lower portion 513 of each of the device brackets 502 in the same direction such that the distance between the device surface 506 and the mount surface 503 is altered. As described above, translation may be accomplished by rotating each of the four bracket positioners 516a, 516b, 516c and 516d depicted in FIG. 1 to cause each of the device brackets 502 of the device bracket assemblies 500 to move relative to the respective mount engagement brackets 501. Accordingly, a display device attached to the device bracket assemblies 500 is selectively movable in a direction substantially perpendicular to the mounting surface, i.e., substantially parallel to the Z-axis of FIG. 1.

The attached display device is movable in a fourth degree of freedom that pivots the display about an axis that is substantially parallel to the mounting surface and substantially parallel to the principal axis of the device bracket assembly 500, i.e., substantially parallel to the Y-axis of FIG. 1. Pivoting of the attached display may be accomplished by operating the bracket positioners 516 of one of the two device bracket assemblies 500 as described above in translating the attached display device. For example, with reference to FIG. 1, operating the left bracket positioners 516a and 516b of the left side device bracket assembly 500 in the same orientation, causes the device bracket 502 to translate substantially in the Z direction, pivoting the left portion of the attached display either outwardly or inwardly with respect to the mounting surface. Depending on the state of the other device bracket assembly 500, additional pivoting of the display may be accomplished by adjustment of the right bracket positioners 516c and 516d of the right side device bracket assembly 500 to translate the respective device bracket 502 in a direction substantially opposite of the translation applied to the left device bracket 502. By the above described adjustments, an attached display device may thus be pivoted about an axis substantially parallel to the Y-axis.

The attached display device is also movable in a fifth degree of freedom that tilts the display about an axis that is substantially parallel to the surface and substantially perpendicular to the principal axis of the device bracket assembly 500, i.e., parallel to the X-axis of FIG. 1. For example, the display device may be downwardly tilted by operation, in the same orientation, each of the upper bracket positioners 516a and 516c of the device bracket assemblies 500, thereby moving each of the upper portions 512 of the respective device brackets 502. By this adjustment, each of the upper portions 512 are moved outwardly away from the mount engagement brackets 501, thereby tilting the attached display device downwardly with respect to the mounting surface. Additional tilt may be accomplished by oppositely adjusting each of the lower bracket positioners 516b and 516d to move each of the lower portions 513 toward the mounting surface. Upward tilt of the attached display device about an axis substantially parallel the X-axis is accomplished by reversing the above adjustments. Additional adjustment of the position and orientation of the attached display device may be achieved by adjusting one or more of the bracket positioners 516a, 516b, 516c and/or 516d to impart various combinations of translation, tilt and pivot and off-axis rotation to the attached display device.

Figure 11:
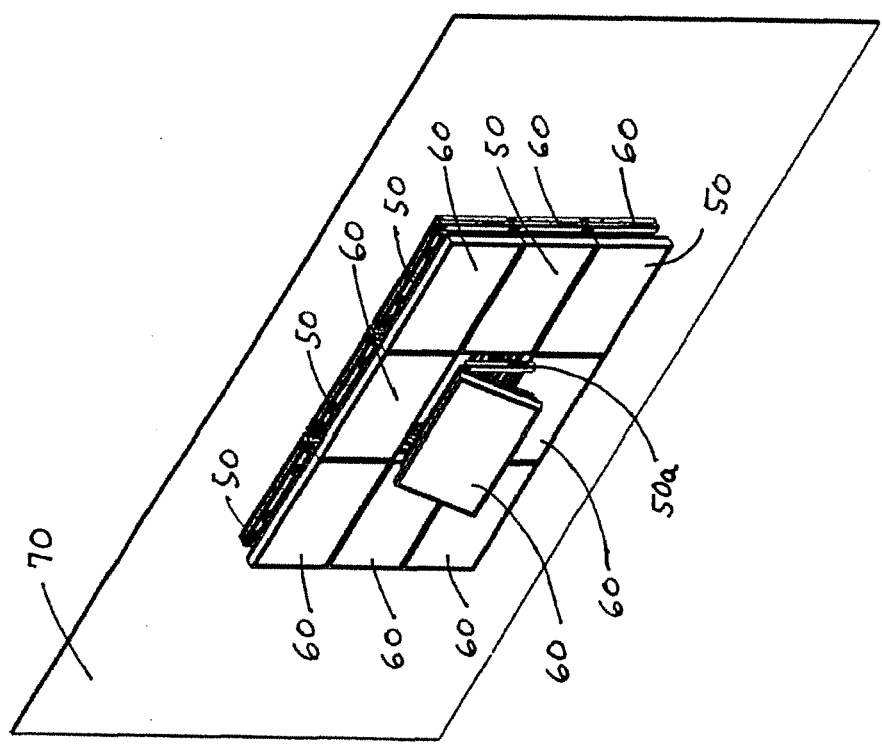
FIG. 11 is a perspective view showing a plurality of the mounting devices of FIG. 1 with attached display devices arranged in an array to form a video wall.
Figure 12:
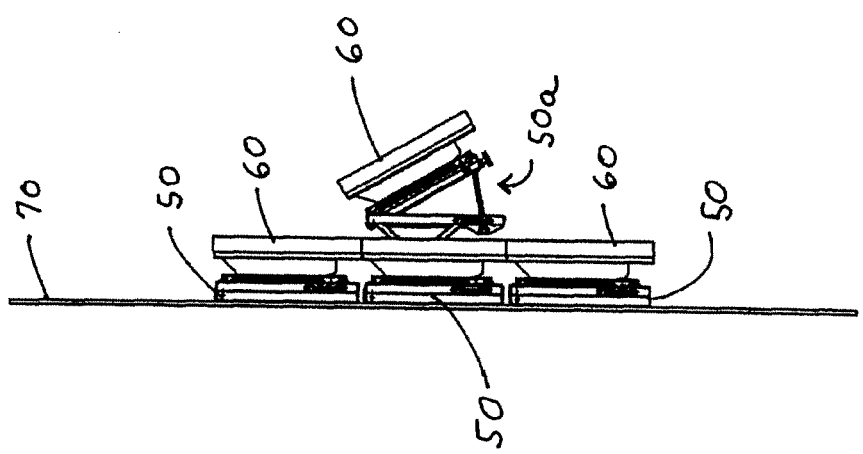
FIG. 12 is a left side view showing the plurality of mounting devices of FIG. 11.

The mounting system 50 may be used in a single display mounting arrangement. The plurality of positioning features of the mounting system 50 described above, including the mount positioners 320 and the bracket positioners 516, provide precise control over the orientation and position of the attached display device in various degrees of freedom relative to the mounting surface. Additionally, a plurality of the mounting systems 50, each configured for attachment to a display device, may be arranged in an array to form a video wall comprising a plurality of display devices. FIGS. 11 and 12 depict an exemplary embodiment of a video wall with nine display devices arranged in a three-by-three array. In the depicted embodiment, each of the nine displays 60 is attached to a mounting system 50 that is secured to the mounting surface 70. The centrally located mounting system 50*a* is in the extended and service position.

Figure 13:
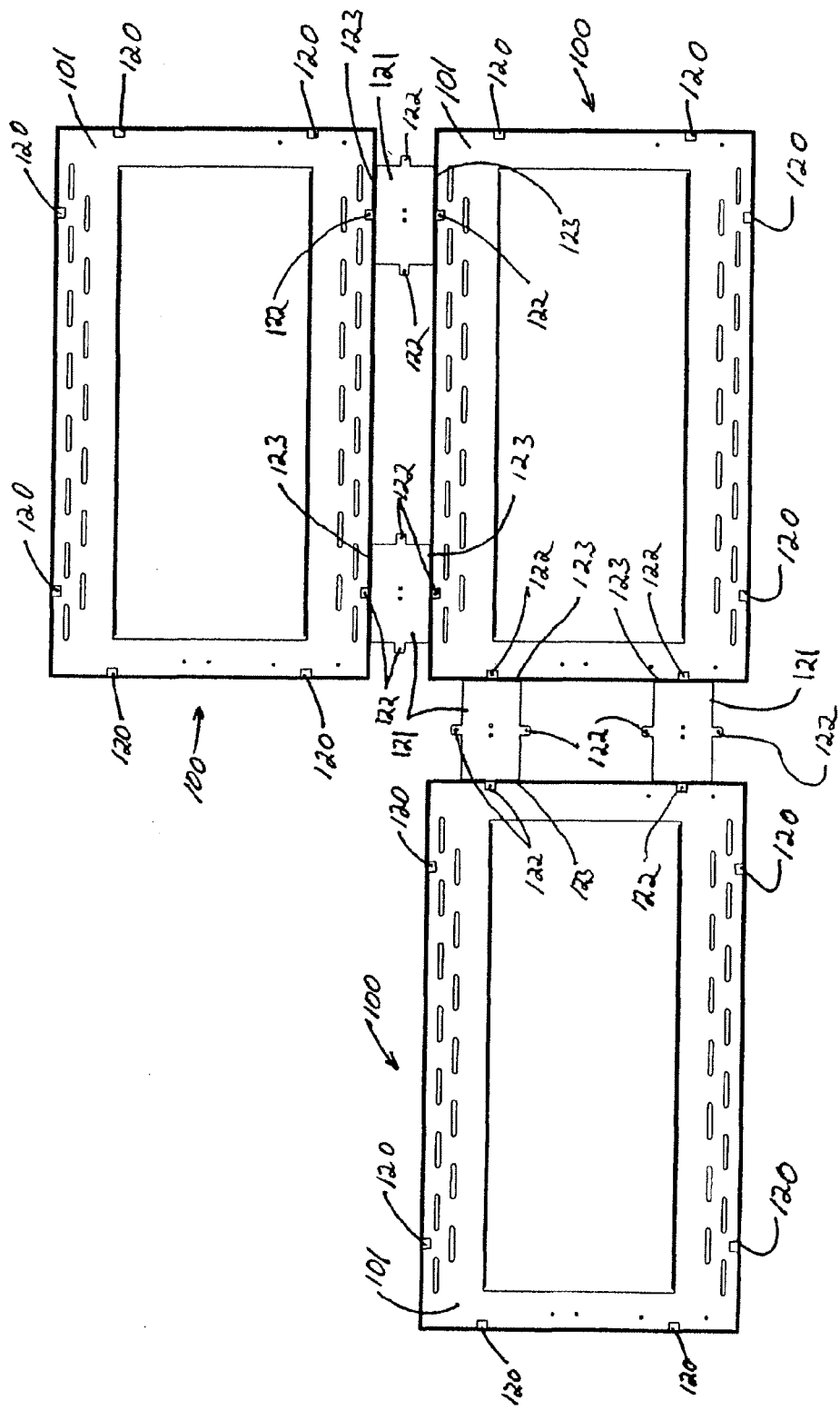
FIG. 13 is a front plan view showing an arrangement of a plurality of the surface brackets of the mounting devices of FIG. 1 arranged in an array and engaged by a plurality of spacers.
Figure 15A:
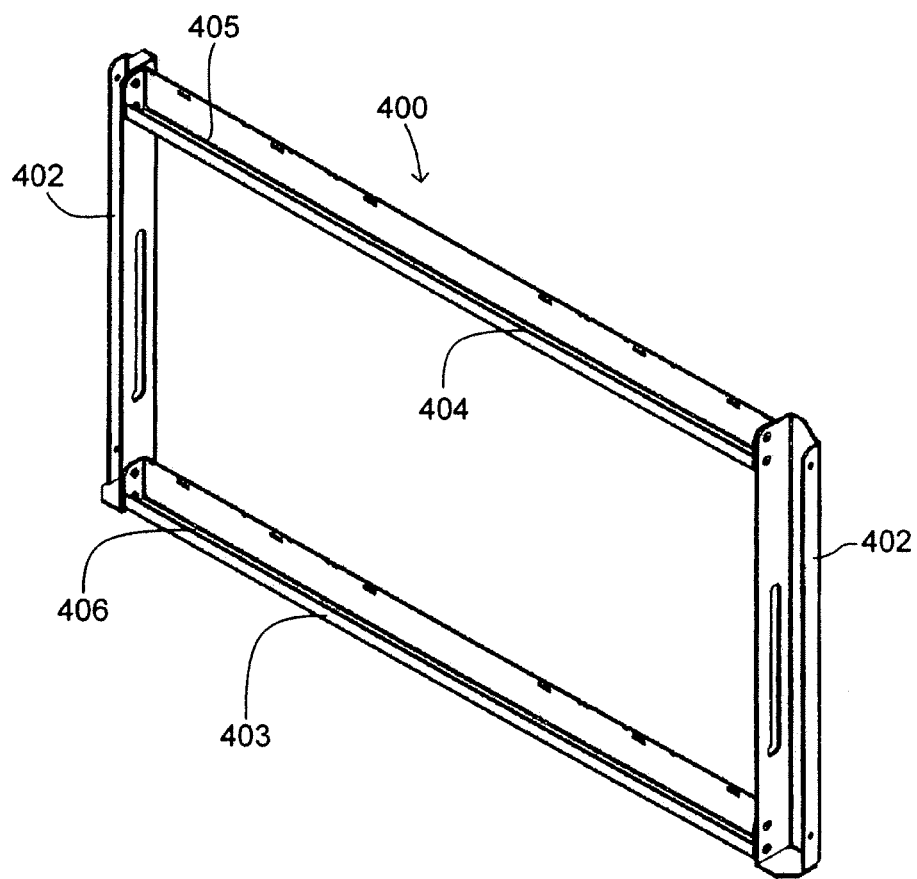
FIG. 15A is an isometric view of a mount bracket constructed according to a particular embodiment.
Figure 15B:
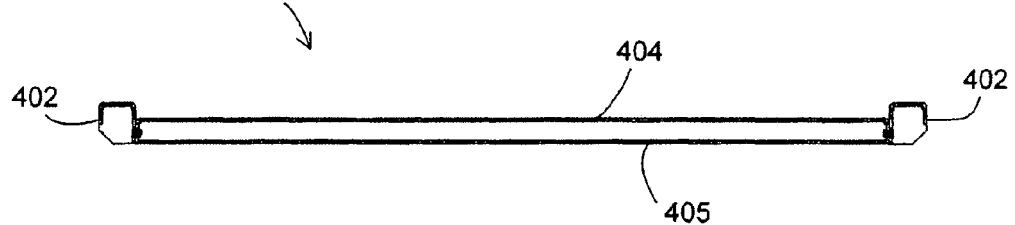
FIG. 15B is a top plan view of the mount bracket of FIG. 15A.
Figure 15D:
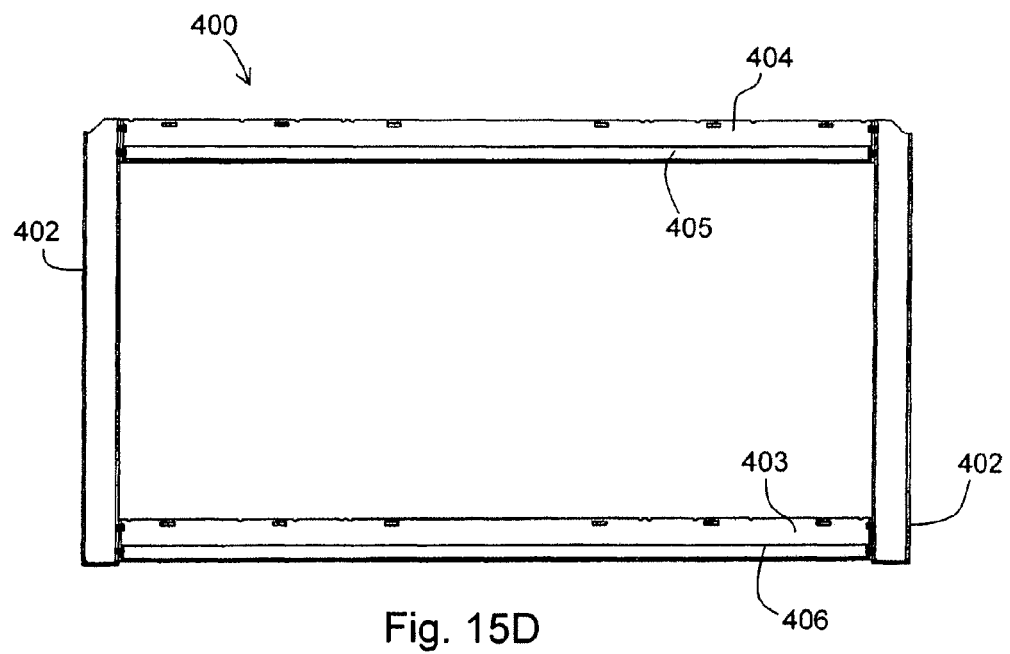
FIG. 15D is a front elevational view of the mount bracket of FIG. 15A.
Figure 15C:
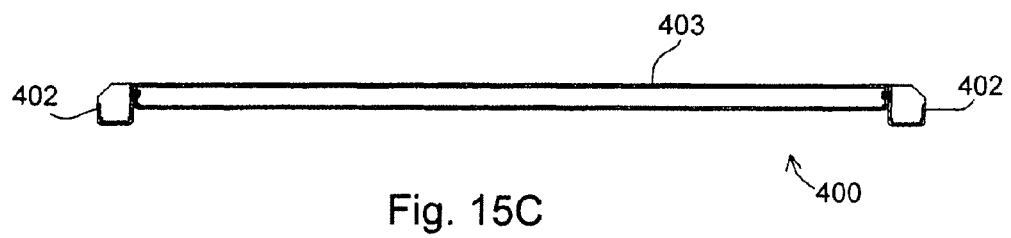
FIG. 15C is a bottom plan view of the mount bracket of FIG. 15A.

With reference to FIGS. 13 and 14, one or more spacers 121 may be disposed between adjacent surface brackets 100 arranged in a video wall array. Each of the spacers 121 may be used in orientating the plurality of mounting systems 50 relative to each other on the mounting surface. In particular, the spacers 121 may facilitate positioning and aligning adjacent surface brackets 100 or other feature of the mounting system 50 associated with the mounting surface. The spacers 121 may further include one or more spacer openings 124 to receive fasteners for attachment of the spacers 121 to the mounting surface. The spacers 121 may include a plurality of mount engagement features 122 that are configured to interface with the spacer engagement features 120 located on the surface bracket 100. As shown, the plurality of mount engagement features 122 comprise tabs extending from a periphery 123 of the spacer 121. However, in other embodiments the mount engagement features 122 may include openings, pins or other elements that are configured to associate with the spacer engagement features 120. In the depicted embodiment, the tabs of the spacer 121 are received by the spacer engagement feature 120 and a portion of the periphery 123 engages the edge of the surface bracket 100. As shown in FIG. 13, a pair of the spacers 121 may each be engaged with vertically and horizontally adjacent surface brackets 100.

The arrangement depicted in FIG. 13 separates the adjacent surface brackets 100 by a predefined horizontal distance and a predefined vertical distance and orientates the adjacent surface brackets 100 in a parallel configuration. FIGS. 14A-14D (not to scale) depict several variations of the spacer 121. As shown, the spacers 121 may be constructed to have various lengths and/or heights to effect the predefined horizontal and predefined vertical distances between the surface brackets 100. Various embodiments of the spacer 121 may be constructed having length and height dimensions that correlate with standard display sizes to facilitate installation of a video wall having uniform spacing, and in various embodiments, minimal spacing, between the adjacent displays 60.

The positioning features of the plurality of mounting systems 50 may be adjusted while the mounting system is in the extended and/or the service positions to precisely position and orientate each of the displays 60 in the array with respect to each other. For example, variations in relative attachment position of the various mounting systems 50 on the mounting surface, as well as variations in the mounting surface 70 itself and/or other variations, may be overcome via adjustment of the positioning features. Thus, by installing a plurality of the mounting systems 50, a video wall may be efficiently erected and adjusted to provide a uniformly orientated and positioned array of the display devices 60. Still further, the positioning features of the plurality of mounting systems 50 may be utilized to create specialized mounting effects for a video wall such as translating, pivoting and/or tilting one or more display devices 60 or an array row and/or column of the display devices 60 relative to another display device 60 or an array row and/or column of the display devices 60.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated.

What is claimed is:

1. A mounting system, comprising:
a surface bracket configured to operatively attach to a mounting surface;
at least one arm assembly operatively connected to the surface bracket;
a mount bracket operatively connected to the surface bracket via the at least one arm assembly, the mount bracket translatable towards and away from the surface bracket along an axis substantially perpendicular to a plane defined by the mounting surface via adjustment of the at least one arm assembly; and
at least one device bracket assembly removably and operably connected to the mount bracket, each of the at least one device bracket assembly comprising:
a mount engagement bracket selectively engagable with the mount bracket, the mount engagement bracket having a mount surface,
a device bracket configured to operatively attach to a display device, the device bracket movably and operatively connected to the mount engagement bracket and including a device bracket surface configured to attach to the display device, and
a plurality of positioner assemblies configured to selectively adjust the device bracket relative to the mount engagement bracket, wherein a first selective adjustment of the plurality of positioner assemblies results in a translation of the device bracket relative to the mount engagement bracket such that a distance between the device bracket surface and the mount surface is altered, and wherein a second selective adjustment of the plurality of positioner assemblies results in a tilting of the device bracket relative to the mount engagement bracket.

2. The mounting system of claim 1, wherein the at least one device bracket assembly comprises a pair of device bracket assemblies.

3. The mounting system of claim 1, wherein each of the at least one device bracket assembly further comprises a mount positioner, the mount positioner movably associated with the mount engagement bracket such that adjustment of the mount positioner results in a translation of the mount engagement bracket in a direction substantially parallel to the plane defined by the mounting surface.

4. The mounting system of claim 3, wherein for each of the at least one device bracket assembly, the mount positioner is rotatably associated with the mount engagement bracket, and wherein rotation of the mount positioner results in the translation of the mount engagement bracket in the direction substantially parallel to the plane defined by the mounting surface.

5. The mounting system of claim 1, wherein the at least one arm assembly comprises a pair of arm assemblies.

6. The mounting system of claim 5, wherein each of the pair of arm assemblies includes a first arm and a second arm, the first arm and the second arm pivotally connected to each other at a location proximate the midpoint of the first arm and the midpoint of the second arm.

7. The mounting system of claim 1, further comprising a service strut configured to move between a first position, where the display device is positioned in a viewing orientation, and a second position, where the display device is positioned in a service orientation such that adjustments may be made to a rear side of the display device.

8. A mounting system, comprising:
a surface bracket configured to operatively attach to a mounting surface;
a mount bracket operatively connected to the surface bracket; and
a plurality of device bracket assemblies removably and operably connected to the mount bracket, each of the plurality of device bracket assemblies comprising:
a mount engagement bracket selectively engagable with the mount bracket,
a device bracket configured to operatively attach to a display device, the device bracket movably and operatively connected to the mount engagement bracket and including a device bracket surface configured to attach to the display device,
a first bracket positioner assembly being rotatably associated with the mount engagement bracket and configured such that rotation of a first portion of the first bracket positioner assembly increases a distance between a first portion of the device bracket relative to the mount engagement bracket in a direction substantially perpendicular to a plane defined by the mounting surface, and
a second bracket positioner assembly being rotatably associated with the mount engagement bracket and configured such that rotation of a first portion of the second bracket positioner assembly increases a distance between a second portion of the device bracket relative to the mount engagement bracket in the direction substantially perpendicular to the plane defined by the mounting surface,
wherein the first portion of the first bracket positioner assembly and the first portion of the second bracket positioner assembly are independently rotatable, and wherein corresponding rotation of the first portion of the first bracket positioner assembly and the first portion of the second bracket positioner assembly in the same orientation results in a translational movement of the device bracket relative to the mount engagement bracket.

9. The mounting system of claim 8, wherein each of the plurality of device bracket assemblies further comprise a mount positioner rotatably associated with the mount engagement bracket such that rotation of the mount positioner results in a translation of the mount engagement bracket in a direction substantially parallel to the plane defined by the mounting surface.

10. The mounting system of claim 8, further comprising a plurality of arm assemblies operatively connected to the surface bracket, the plurality of arm assemblies configured to extend between an extended position and a retracted position relative to the surface bracket along an axis substantially perpendicular to a plane defined by the mounting surface, and wherein the mount bracket is operatively connected to the surface bracket via the plurality of arm assemblies.

11. The mounting system of claim 10, wherein the plurality of arm assemblies each include a first arm and a second arm, the first arm and the second arm pivotally connected to each other at a location proximate the midpoint of the first arm and the midpoint of the second arm.

12. A mounting system, comprising:
a surface bracket configured to operatively attach to a mounting surface;
a mount bracket operatively connected to the surface bracket; and
a plurality of device bracket assemblies removably and operably connected to the mount bracket, each of the plurality of device bracket assemblies comprising:
a mount engagement bracket selectively engagable with the mount bracket, the mount engagement bracket having a mount surface,
a device bracket configured to operatively attach to a display device, the device bracket movably and operatively connected to the mount engagement bracket and including a device bracket surface configured to attach to the display device, and
a plurality of positioner assemblies configured to selectively adjust the device bracket relative to the mount engagement bracket, each positioner assembly having a first portion engaged with a second portion, wherein a first selective adjustment of the plurality of positioner assemblies results in a translation of the device bracket relative to the mount engagement bracket such that a distance between the device bracket surface and the mount surface is altered, and wherein a second selective adjustment of the plurality of positioner assemblies results in a tilting of the device bracket relative to the mount engagement bracket.

13. The mounting system of claim 12, wherein the first portion threadedly engages with the second portion.

14. The mounting system of claim 13, wherein a positioner assembly of the plurality of positioner assemblies extends through an opening of the mount engagement bracket.

15. The mounting system of claim 14, wherein the first portion of the positioner assembly extending through the opening of the mount engagement bracket is rotatable relative to the mount engagement bracket.

16. The mounting system of claim 12, wherein the plurality of device bracket assemblies comprises a left side device bracket assembly and a right side bracket assembly, wherein the first selective adjustment of the plurality of positioner assemblies of one of the left side device bracket assembly or the right side bracket assembly results in a pivoting of a display device operatively attached to the left side device bracket assembly and the right side bracket assembly relative to the mounting surface.

17. The mounting system of claim 12, further comprising a plurality of arm assemblies operatively connected to the surface bracket, the plurality of arm assemblies configured to extend between an extended position and a retracted position relative to the surface bracket along an axis substantially perpendicular to a plane defined by the mounting surface, and wherein the mount bracket is operatively connected to the surface bracket via the plurality of arm assemblies.

18. The mounting system of claim 12, further comprising a service strut configured to move between a first position, where the display device is positioned in a viewing orientation, and a second position, where the display device is positioned in a service orientation such that adjustments may be made to a rear side of the display device.

19. The mounting system of claim 1, wherein each positioner assembly of the plurality of positioner assemblies has a first portion engaged with a second portion.

20. The mounting system of claim 18, wherein the first portion threadedly engages with the second portion.

* * * * *